US012759046B2

(12) United States Patent
Byrd et al.

(10) Patent No.: US 12,759,046 B2
(45) Date of Patent: Oct. 13, 2026

(54) METHOD OF FORMING AN INTERCONNECT FOR AN ELECTROCHEMICAL DEVICE STACK USING SPARK PLASMA SINTERING

(71) Applicant: BLOOM ENERGY CORPORATION, San Jose, CA (US)

(72) Inventors: Adam Byrd, Sunnyvale, CA (US); Adil Ashary, San Jose, CA (US)

(73) Assignee: BLOOM ENERGY CORPORATION, San Jose, CA (US)

( * ) Notice: Subject to any disclaimer, the term of this patent is extended or adjusted under 35 U.S.C. 154(b) by 457 days.

(21) Appl. No.: 18/458,298

(22) Filed: Aug. 30, 2023

(65) Prior Publication Data

US 2024/0082916 A1 Mar. 14, 2024

Related U.S. Application Data

(60) Provisional application No. 63/375,407, filed on Sep. 13, 2022.

(51) Int. Cl.

| | |
|---|---|
| ***B22F 7/06*** | (2006.01) |
| ***B22F 3/105*** | (2006.01) |
| ***H01M 8/021*** | (2016.01) |
| ***H01M 8/0217*** | (2016.01) |
| ***H01M 8/0228*** | (2016.01) |

(Continued)

(52) U.S. Cl.

CPC .............. *B22F 7/064* (2013.01); *B22F 3/105* (2013.01); *H01M 8/021* (2013.01); *H01M 8/0217* (2013.01); *H01M 8/0228* (2013.01); *H01M 8/1246* (2013.01); *B22F 2003/1051* (2013.01); *B22F 2202/13* (2013.01); *B22F 2998/10* (2013.01); *B22F 2999/00* (2013.01); *H01M 2008/1293* (2013.01)

(58) Field of Classification Search

CPC .. B22F 7/064; B22F 3/105; B22F 2003/1051; B22F 2202/13; B22F 2998/10; B22F 2999/00; B22F 1/09; H01M 8/021; H01M 8/0217; H01M 8/0228; H01M 8/1246; H01M 2008/1293; H01M 8/0232; H01M 8/0245; Y02E 60/50; C22C 38/18; C25B 9/65; C25B 9/77

USPC .............................................................. 419/8

See application file for complete search history.

(56) References Cited

U.S. PATENT DOCUMENTS

| | | | |
|---|---|---|---|
| 8,652,691 | B1 | 2/2014 | Perry et al. |
| 9,452,475 | B2 | 9/2016 | Armstrong et al. |
| 9,468,736 | B2 | 10/2016 | Darga et al. |

(Continued)

OTHER PUBLICATIONS

Khaerudini et al. "Thermal stability of nanostructured iron-chromium alloys for interconnect application of solid oxide fuel cells," Corrosion Engineering, Science and Technology, vol. 47, No. 7 (Year: 2012).*

(Continued)

*Primary Examiner* — Danielle M. Carda

(74) *Attorney, Agent, or Firm* — THE MARBURY LAW GROUP PLLC

(57) ABSTRACT

A method of forming an interconnect for an electrochemical device stack includes loading a die with an interconnect material comprising an interconnect body powder comprising chromium and iron, and spark plasma sintering (SPS) the interconnect material to form a body of the interconnect.

20 Claims, 17 Drawing Sheets

(51) Int. Cl.
*H01M 8/12* (2016.01)
*H01M 8/1246* (2016.01)

(56) References Cited

U.S. PATENT DOCUMENTS

| | | | | |
|---|---|---|---|---|
| 9,502,721 | B2 | 11/2016 | Herchen et al. | |
| 9,923,211 | B2 | 3/2018 | Batawi et al. | |
| 10,079,393 | B1 | 9/2018 | Verma et al. | |
| 10,431,833 | B2 | 10/2019 | Wilson et al. | |
| 10,553,879 | B2 | 2/2020 | El Batawi et al. | |
| 10,873,092 | B2 | 12/2020 | Khurana et al. | |
| 11,355,762 | B2 | 6/2022 | Gasda et al. | |
| 11,417,894 | B2 | 8/2022 | Armstrong | |
| 2013/0082421 | A1 * | 4/2013 | Allemand | C25B 9/00 264/434 |
| 2013/0230644 | A1 | 9/2013 | Armstrong et al. | |
| 2013/0230792 | A1 | 9/2013 | Wilson et al. | |
| 2015/0147679 | A1 | 5/2015 | Darga et al. | |
| 2015/0311538 | A1 | 10/2015 | Batawi et al. | |
| 2018/0166703 | A1 | 6/2018 | El Batawi et al. | |
| 2018/0248202 | A1 | 8/2018 | Khurana et al. | |
| 2019/0372132 | A1 | 12/2019 | Gasda et al. | |
| 2021/0075027 | A1 * | 3/2021 | Khurana | H01M 4/0471 |
| 2022/0315479 | A1 | 10/2022 | Gasda et al. | |
| 2022/0336828 | A1 | 10/2022 | El Batawi et al. | |
| 2022/0344676 | A1 | 10/2022 | Armstrong | |

OTHER PUBLICATIONS

Khaerudini, D. S., et al., "Thermal stability of nanostructured iron-chromium alloys for interconnect application of Solid oxide fuel cells," Corrosion Engineering, Science and Technology, vol. 47, No. 7, pp. 536-552, (2012), https://doi.org/10.1179/1743278212Y.0000000027.

EPO Office Communication, Extended European Search Report for Patent Application No. 23194167.5, mailed Jun. 17, 2024, 9 pages.

Tkachenko, S. et al., "Novel Ti—Si—C composites for SOFC interconnect materials: Production optimization," Ceramics International, vol. 48, Issue 19, Part A, Oct. 1, 2022, pp. 27785-27798, https://doi.org/10.1016/j.ceramint.2022.06.081.

* cited by examiner

| Element | Region 1 Weight % | Atomic % |
|---|---|---|
| O | 10.7 | 41.1 |
| Mn | 26.0 | **29.2** |
| Sr | 6.7 | 4.7 |
| La | 56.6 | **25.1** |
| Total | 100 | 100 |

| Element | Region 2 Weight % | Atomic % |
|---|---|---|
| Cr | 90.4 | 88.9 |
| Fe | 8.6 | 7.9 |
| O | 1.0 | 3.2 |
| Total | 100 | 100 |

| Element | Region 3 Weight % | Atomic % |
|---|---|---|
| O | 10.7 | 40.9 |
| Mn | 25.9 | **28.9** |
| Sr | 6.7 | 4.7 |
| La | 56.1 | **24.8** |
| Cr | 0.6 | 0.7 |
| Total | 100 | 100 |

| Element | Region 4 Weight % | Atomic % |
|---|---|---|
| O | 10.7 | 42.8 |
| Mn | 13.0 | **15.1** |
| Sr | 7.5 | 5.5 |
| La | 62.5 | **28.8** |
| Cr | 6.4 | 7.9 |
| Total | 100 | 100 |

| Element | Region 5 Weight % | Atomic % |
|---|---|---|
| O | 19.4 | 45.3 |
| Cr | 55.3 | 39.7 |
| Mn | 20.1 | 13.6 |
| La | 5.2 | 1.4 |
| Total | 100 | 100 |

| Element | Region 6 Weight % | Atomic % |
|---|---|---|
| O | 21.2 | 46.7 |
| Cr | 78.8 | 53.4 |
| Total | 100 | 100 |

Region 4

| Element | Weight % | Atomic % |
|---|---|---|
| O | 11.36 | 31.06 |
| Mn | 57.53 | 45.8 |
| Co | 30.61 | 22.72 |
| Cr | 0.5 | 0.42 |
| Total | 100 | 100 |

Region 5

| Element | Weight % | Atomic % |
|---|---|---|
| O | 9.48 | 27.01 |
| Mn | 50.24 | 41.7 |
| Co | 38.81 | 30.03 |
| Cr | 0.85 | 0.75 |
| Fe | 0.62 | 0.51 |
| Total | 100 | 100 |

Region 6

| Element | Weight % | Atomic % |
|---|---|---|
| O | 12.26 | 31.86 |
| Cr | 61.99 | 49.58 |
| Mn | 7.43 | 5.63 |
| Co | 18.32 | 12.93 |
| Total | 100 | 100 |

Region 7

| Element | Weight % | Atomic % |
|---|---|---|
| Cr | 70.32 | 72.83 |
| Co | 28.95 | 26.46 |
| Mn | 0.72 | 0.71 |
| Total | 100 | 100 |

Region 8

| Element | Weight % | Atomic % |
|---|---|---|
| Cr | 98.64 | 95.71 |
| O | 1.36 | 4.29 |
| Total | 100 | 100 |

Region 15

| Element | Weight % | Atomic % |
|---|---|---|
| O | 10.13 | 28.37 |
| Mn | 58.64 | 47.84 |
| Co | 30.86 | 23.47 |
| Cr | 0.38 | 0.32 |
| Total | 100 | 100 |

Region 16

| Element | Weight % | Atomic % |
|---|---|---|
| O | 12.56 | 32.37 |
| Cr | 65.21 | 51.72 |
| Mn | 6.91 | 5.19 |
| Co | 15.32 | 10.72 |
| Total | 100 | 100 |

Region 17

| Element | Weight % | Atomic % |
|---|---|---|
| Cr | 75.98 | 78.19 |
| Co | 24.02 | 21.81 |
| Total | 100 | 100 |

Region 18

| Element | Weight % | Atomic % |
|---|---|---|
| Cr | 100 | 100 |
| Total | 100 | 100 |

METHOD OF FORMING AN INTERCONNECT FOR AN ELECTROCHEMICAL DEVICE STACK USING SPARK PLASMA SINTERING

FIELD

The present embodiments are directed to fuel cell and electrolyzer interconnect manufacturing methods, specifically to methods of forming interconnects using spark plasma sintering (SPS).

BACKGROUND

A typical solid oxide fuel cell stack includes multiple fuel cells separated by metallic interconnects (IC) which provide both electrical connection between adjacent cells in the stack and channels for delivery and removal of fuel and oxidant. The metallic interconnects are commonly composed of a Cr based alloy such as an alloy known as CrFe which has a composition of 95 wt % Cr-5 wt % Fe, or Cr—Fe—Y having a 94 wt % Cr-5 wt % Fe-1 wt % Y composition. The CrFe and CrFeY alloys retain their strength and are dimensionally stable at typical solid oxide fuel cell (SOFC) operating conditions, e.g. 700-900 C in both air and wet fuel atmospheres. However, fabrication of the interconnects is relatively complex and requires multiple steps using different fabrication apparatuses.

SUMMARY

According to various embodiments, a method of forming an interconnect for an electrochemical device stack includes loading a die with an interconnect material comprising an interconnect body powder comprising chromium and iron, and spark plasma sintering (SPS) the interconnect material to form a body of the interconnect.

DETAILED DESCRIPTION

The various embodiments will be described in detail with reference to the accompanying drawings. The drawings are not necessarily to scale, and are intended to illustrate various features of the invention. Wherever possible, the same reference numbers will be used throughout the drawings to refer to the same or like parts. References made to particular examples and implementations are for illustrative purposes, and are not intended to limit the scope of the invention or the claims.

Ranges can be expressed herein as from "about" one particular value, and/or to "about" another particular value. When such a range is expressed, examples include from the one particular value and/or to the other particular value. Similarly, when values are expressed as approximations, by use of the antecedent "about" or "substantially" it will be understood that the particular value forms another aspect. In some embodiments, a value of "about X" may include values of +/−1% X. It will be further understood that the endpoints of each of the ranges are significant both in relation to the other endpoint, and independently of the other endpoint.

Figure 1A:
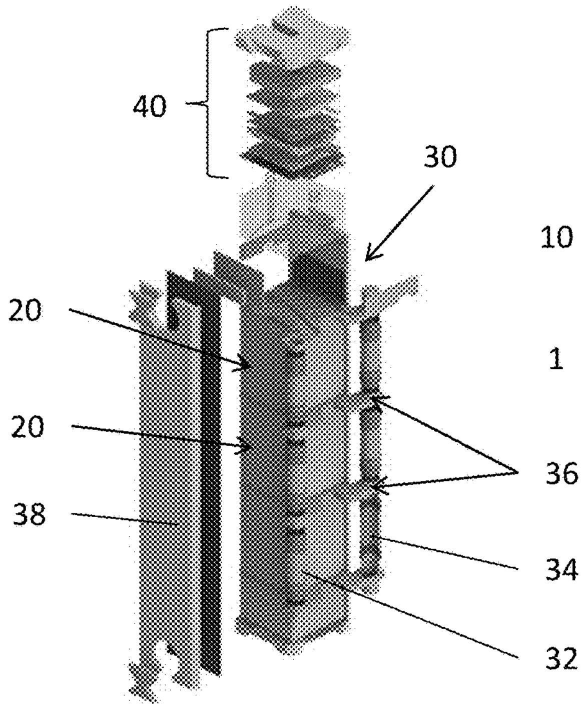
FIG. 1A (Related Art)
FIG. 1A is a perspective view of a conventional fuel cell column.
Figure 1B:
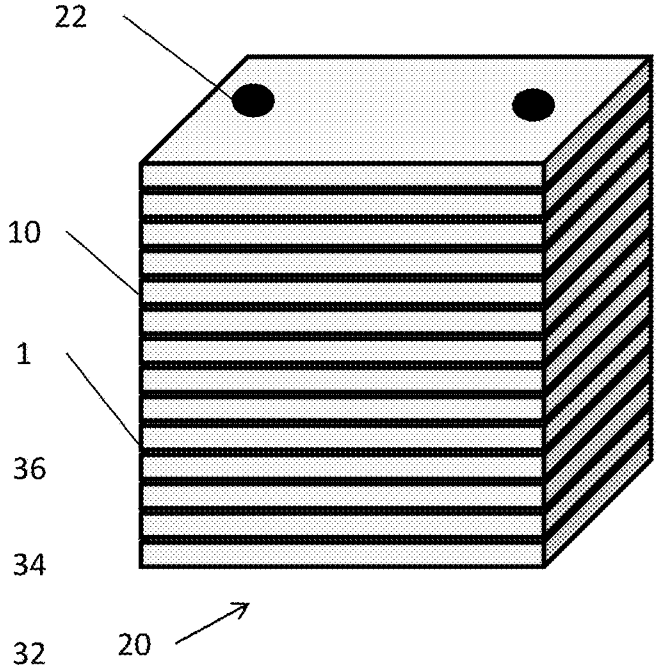
FIG. 1B (Related Art)
FIG. 1B is a perspective view of one counter-flow solid oxide fuel cell (SOFC) stack included in the column of FIG. 1A.
Figure 1C:
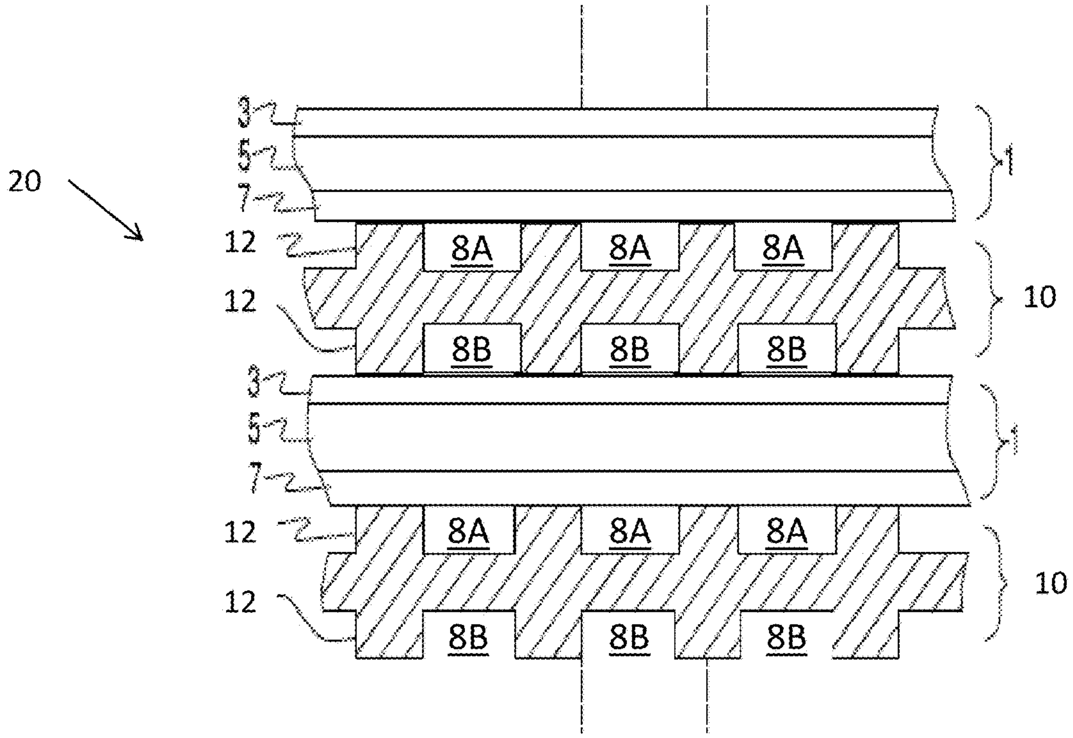
FIG. 1C (Related Art)
FIG. 1C is a side cross-sectional view of a portion of the stack of FIG. 1B.

FIG. 1A is a perspective view of a conventional fuel cell column 30, FIG. 1B is a perspective view of one counter-flow solid oxide fuel cell (SOFC) stack 20 included in the column 30 of FIG. 1A, and FIG. 1C is a side cross-sectional view of a portion of the stack 20 of FIG. 1B.

Referring to FIGS. 1A and 1B, the column 30 may include one or more stacks 20, a fuel inlet conduit 32, an anode exhaust conduit 34, and anode feed/return assemblies 36 (e.g., anode splitter plates (ASP's) 36). The column 30 may also include side baffles 38 and a compression assembly 40. The fuel inlet conduit 32 is fluidly connected to the ASP's 36 and is configured to provide the fuel feed to each ASP 36, and anode exhaust conduit 34 is fluidly connected to the ASP's 36 and is configured to receive anode fuel exhaust from each ASP 36.

The ASP's 36 are disposed between the stacks 20 and are configured to provide a hydrocarbon fuel containing fuel feed to the stacks 20 and to receive anode fuel exhaust from the stacks 20. For example, the ASP's 36 may be fluidly connected to internal fuel riser channels 22 formed in the stacks 20, as discussed below.

Referring to FIG. 1C, the stack 20 includes multiple fuel cells 1 that are separated by interconnects 10, which may also be referred to as gas flow separator plates or bipolar plates. Each fuel cell 1 includes a cathode electrode 3, a solid oxide electrolyte 5, and an anode electrode 7.

Each interconnect 10 electrically connects adjacent fuel cells 1 in the stack 20. In particular, an interconnect 10 may electrically connect the anode electrode 7 of one fuel cell 1 to the cathode electrode 3 of an adjacent fuel cell 1. FIG. 1C shows that the lower fuel cell 1 is located between two interconnects 10.

Each interconnect 10 includes ribs 12 that at least partially define fuel channels 8A and air channels 8B. The interconnect 10 may operate as a gas-fuel separator that separates a fuel, such as a hydrocarbon fuel, flowing to the fuel electrode (i.e. anode 7) of one cell in the stack from oxidant, such as air, flowing to the air electrode (i.e. cathode 3) of an adjacent cell in the stack. At either end of the stack 20, there may be an air end plate or fuel end plate (not shown) for providing air or fuel, respectively, to the end electrode.

Figure 2A:
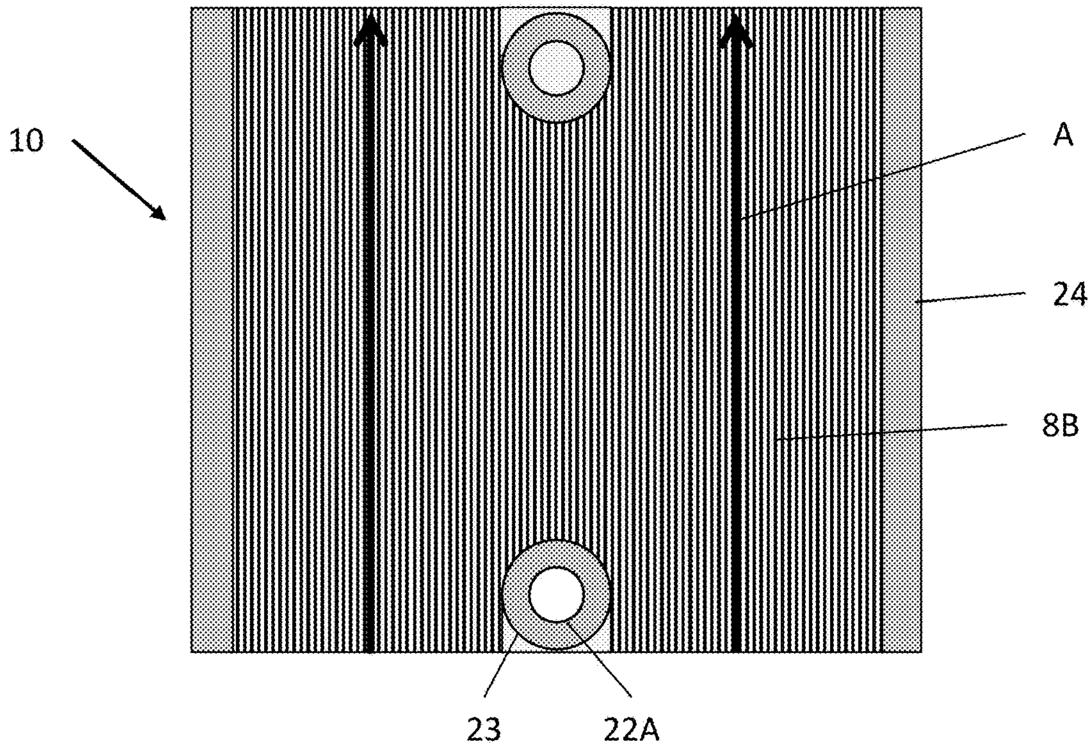
FIG. 2A (Related Art)
FIG. 2A is a top view of the air side of a conventional interconnect of the stack of FIG. 1B.
Figure 2B:
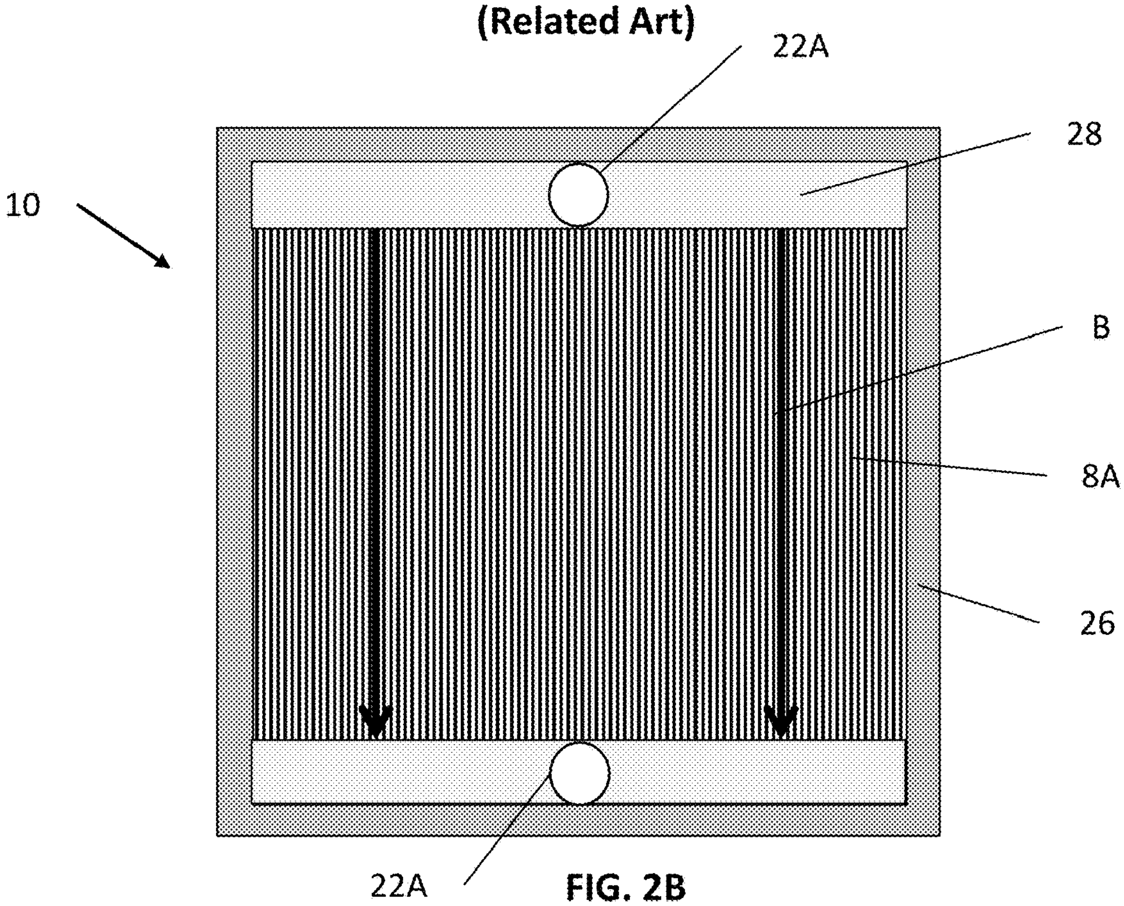
FIG. 2B (Related Art)
FIG. 2B is a top view of the fuel side of the conventional interconnect.

FIG. 2A is a top view of the air side of the conventional interconnect 10, and FIG. 2B is a top view of a fuel side of the interconnect 10. Referring to FIGS. 1C and 2A, the air side includes the air channels 8B. Air flows through the air channels 8B to a cathode electrode 3 of an adjacent fuel cell 1. In particular, the air may flow across the interconnect 10 in a first direction A as indicated by the arrows.

Ring seals 23 may surround fuel holes 22A of the interconnect 10, to prevent fuel from contacting the cathode electrode. Peripheral strip-shaped seals 24 are located on peripheral portions of the air side of the interconnect 10. The seals 23, 24 may be formed of a glass material. The peripheral portions may be in the form of an elevated plateau which does not include ribs or channels. The surface of the peripheral regions may be coplanar with tops of the ribs 12.

Referring to FIGS. 1C and 2B, the fuel side of the interconnect 10 may include the fuel channels 8A and fuel manifolds 28 (e.g., fuel plenums). Fuel flows from one of the fuel holes 22A, into the adjacent manifold 28, through the fuel channels 8A, and to an anode 7 of an adjacent fuel cell 1. Excess fuel may flow into the other fuel manifold 28 and then into the adjacent fuel hole 22A. In particular, the fuel may flow across the interconnect 10 in a second direction B, as indicated by the arrows. The second direction B may be perpendicular to the first direction A (see FIG. 2A).

A frame-shaped seal 26 is disposed on a peripheral region of the fuel side of the interconnect 10. The peripheral region may be an elevated plateau which does not include ribs or channels. The surface of the peripheral region may be coplanar with tops of the ribs 12.

Accordingly, a conventional counter-flow fuel cell column, as shown in FIGS. 1A, 1B, 1C, 2A, and 2B, may include complex fuel distribution systems (fuel rails and anode splitter plates). In addition, the use of an internal fuel riser may require holes in fuel cells and corresponding seals, which may reduce an active area thereof and may cause cracks in the ceramic electrolytes of the fuel cells 1.

The fuel manifolds 28 may occupy a relatively large region of the interconnect 10, which may reduce the contact area between the interconnect 10 and an adjacent fuel cell by approximately 10%. The fuel manifolds 28 are also relatively deep, such that the fuel manifolds 28 represent relatively thin regions of the interconnect 10. Since the interconnect 10 is generally formed by a powder metallurgy compaction process, the density of fuel manifold regions may approach the theoretical density limit of the interconnect material. As such, the length of stroke of a compaction press used in the compaction process may be limited due to the high-density fuel manifold regions being incapable of being compacted further. As a result, the density achieved elsewhere in the interconnect 10 may be limited to a lower level by the limitation to the compaction stroke. The resultant density variation may lead to topographical variations, which may reduce the amount of contact between the interconnect 10 a fuel cell 1 and may result in lower stack yield and/or performance.

Another important consideration in fuel cell system design is in the area of operational efficiency. Maximizing fuel utilization is a key factor to achieving operational efficiency. Fuel utilization is the ratio of how much fuel is consumed during operation, relative to how much is delivered to a fuel cell. An important factor in preserving fuel cell cycle life may be avoiding fuel starvation in fuel cell active areas, by appropriately distributing fuel to the active areas. If there is a maldistribution of fuel such that some flow field channels receive insufficient fuel to support the electrochemical reaction that would occur in the region of that channel, it may result in fuel starvation in fuel cell areas adjacent that channel. In order to distribute fuel more uniformly, conventional interconnect designs include channel depth variations across the flow field. This may create complications not only in the manufacturing process, but may also require complex metrology to measure these dimensions accurately. The varying channel geometry may be constrained by the way fuel is distributed through fuel holes and distribution manifolds.

One possible solution to eliminate this complicated geometry and the fuel manifold is to have a wider fuel opening to ensure much more uniform fuel distribution across the fuel flow field. Since fuel manifold formation is a factor in density variation, elimination of fuel manifolds should enable more uniform interconnect density and permeability. Accordingly, there is a need for improved interconnects that provide for uniform contact with fuel cells, while also uniformly distributing fuel to the fuel cells without the use of conventional fuel manifolds.

Owing to the overall restrictions in expanding the size of a hotbox of a fuel cell system, there is also a need for improved interconnects designed to maximize fuel utilization and fuel cell active area, without increasing the footprint of a hotbox.

Figure 3A:
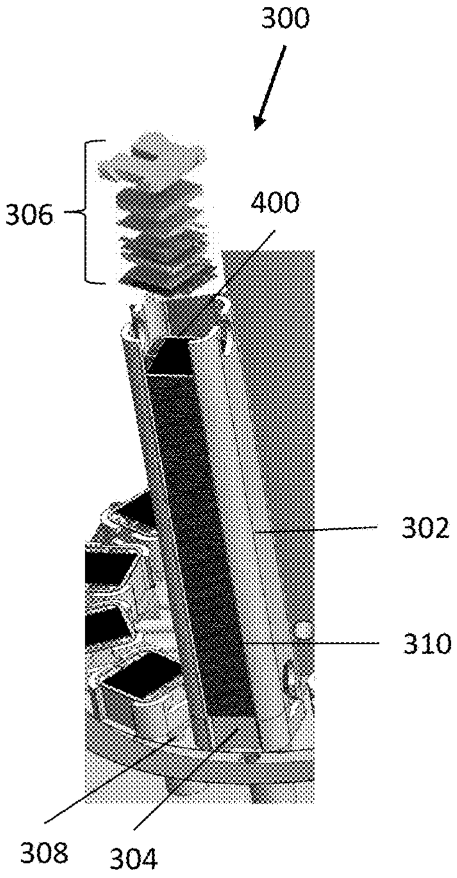
FIG. 3A is a perspective view of a fuel cell stack, according to various embodiments of the present disclosure.
Figure 3C:
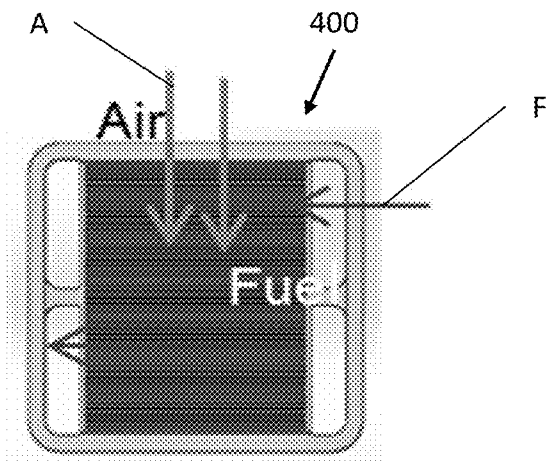
FIG. 3C is a top view of the fuel side of an interconnect included in the stack of FIG. 3A.
Figure 3D:
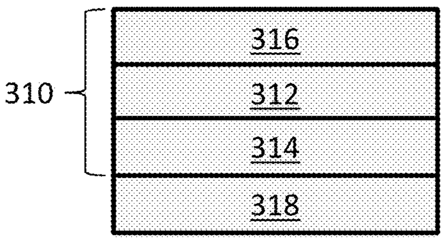
FIG. 3D is a schematic view of a fuel cell included in the stack of FIG. 3A.
Figure 3B:
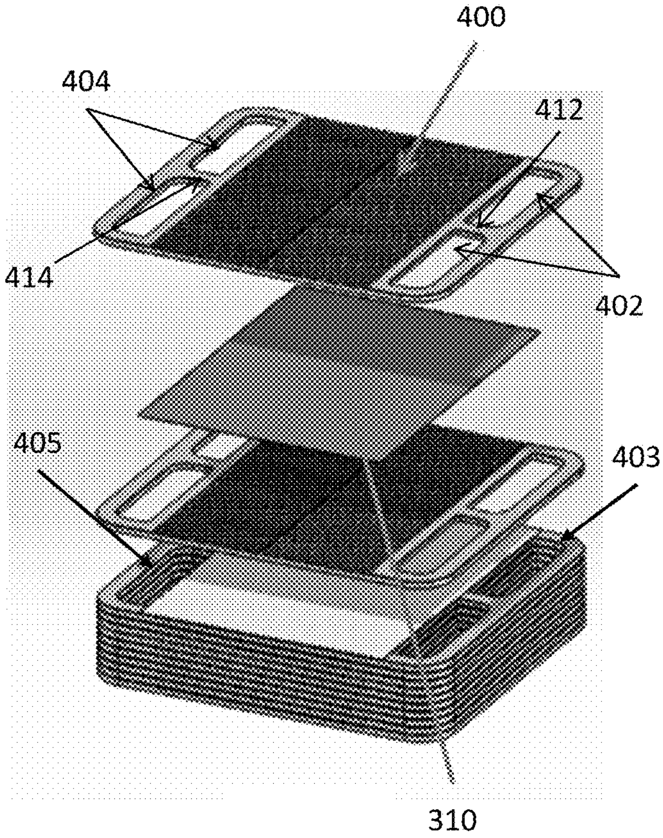
FIG. 3B is an exploded perspective view of a portion of the stack of FIG. 3A.

FIG. 3A is a perspective view of a fuel cell stack 300, according to various embodiments of the present disclosure, FIG. 3B is an exploded perspective view of a portion of the stack 300 of FIG. 3A, FIG. 3C is a top view of the fuel side of an interconnect 400 included in the stack 300, and FIG. 3D is a schematic view of a fuel cell included in the stack 300.

Referring to FIGS. 3A-3D, the fuel cell stack 300, which may also be referred to as a fuel cell column because it lacks ASP's, includes multiple fuel cells 310 that are separated by interconnects 400, which may also be referred to as gas flow separator plates or bipolar plates. One or more stacks 300 may be thermally integrated with other components of a fuel cell power generating system (e.g., one or more anode tail gas oxidizers, fuel reformers, fluid conduits and manifolds, etc.) in a common enclosure or "hotbox."

The interconnects 400 are made from an electrically conductive metal material. For example, the interconnects 400 may comprise a chromium alloy, such as a Cr—Fe alloy.

As discussed in detail below, the interconnects 400 may typically be fabricated using a spark plasma sintering powder metallurgy technique that includes pressing and sintering a Cr—Fe powder, which may be a mixture of Cr and Fe powders or an Cr—Fe alloy powder, to form a Cr—Fe interconnect in a desired size and shape (e.g., a "net shape" or "near net shape" process). In one embodiment, the Cr—Fe powder may be obtained from recycling pre-existing Cr—Fe interconnects. The pre-existing Cr—Fe interconnects may be grit blasted to remove any surface coating, cleaned, and ground and/or milled into a recycled Cr—Fe powder. The recycled Cr—Fe powder may be optionally mixed with fresh (i.e., non-recycled) Cr—Fe powder. A typical chromium-alloy interconnect 400 comprises more than about 90% chromium by weight, such as about 94-96% (e.g., 95%) chromium by weight. An interconnect 400 may also contain less than about 10% iron by weight, such as about 4-6% (e.g., 5%) iron by weight, may contain less than about 2% by weight, such as about zero to 1% by weight, of other materials, such as yttrium or yttria, as well as residual or unavoidable impurities.

Each fuel cell 310 may include a solid oxide electrolyte 312, an anode 314, and a cathode 316. In some embodiments, the anode 314 and the cathode 316 may be printed on the electrolyte 312. In other embodiments, a conductive layer 318, such as a nickel mesh, may be disposed between the anode 314 and an adjacent interconnect 400.

Various materials may be used for the cathode electrode 316, electrolyte 312, and anode electrode 314. For example, the anode electrode 314 may comprise a cermet comprising a nickel containing phase and a ceramic phase. The nickel containing phase may consist entirely of nickel in a reduced state. This phase may form nickel oxide when it is in an oxidized state. Thus, the anode electrode 314 is preferably annealed in a reducing atmosphere prior to operation to reduce the nickel oxide to nickel. The nickel containing phase may include other metals in additional to nickel and/or nickel alloys. The ceramic phase may comprise a stabilized zirconia, such as yttria and/or scandia stabilized zirconia and/or a doped ceria, such as gadolinia, yttria and/or samaria doped ceria.

The electrolyte 312 may comprise a stabilized zirconia, such as scandia stabilized zirconia (SSZ) or yttria stabilized zirconia (YSZ). Alternatively, the electrolyte may comprise another ionically conductive material, such as a doped ceria.

The cathode 316 may comprise an electrically conductive material, such as an electrically conductive perovskite material, such as lanthanum strontium manganite (LSM). Other conductive perovskites, such as LSCo, etc., or metals, such as Pt, may also be used. The cathode electrode 316 may also contain a ceramic phase similar to the anode electrode 314. The electrodes and the electrolyte may each comprise one or more sublayers of one or more of the above described materials.

The fuel cell 310 does not include through holes, such as the fuel holes of conventional fuel cells. Therefore, the fuel cell 310 avoids cracks that may be generated due to the presence of such through holes.

An upper most interconnect 400 and a lowermost interconnect 400 of the stack 300 may be different ones of an air end plate or fuel end plate including features for providing air or fuel, respectively, to an adjacent end fuel cell 310. As used herein, an "interconnect" may refer to either an interconnect located between two fuel cells 310 or an end plate located at an end of the stack and directly adjacent to only one fuel cell 310. Since the stack 300 does not include ASPs and the end plates associated therewith, the stack 300 may include only two end plates. As a result, stack dimensional variations associated with the use of intra-column ASPs may be avoided.

The stack 300 may include side baffles 302, a fuel plenum 304, and a compression assembly 306. The side baffles 302 may be formed of a ceramic material and may be disposed on opposing sides of the fuel cell stack 300 containing stacked fuel cells 310 and interconnects 400. The side baffles 302 may connect the fuel plenum 304 and the compression assembly 306, such that the compression assembly 306 may apply pressure to the stack 300. The side baffles 302 may be curved baffle plates, such each baffle plate covers at least portions of three sides of the fuel cell stack 300. For example, one baffle plate may fully cover the fuel inlet riser side of the stack 300 and partially covers the adjacent front and back sides of the stack, while the other baffle plate fully covers the fuel outlet riser side of the stack and partially covers the adjacent portions of the front and back sides of the stack. The remaining uncovered portions for the front and back sides of the stack allow the air to flow through the stack 300. The curved baffle plates provide an improved air flow control through the stack compared to the conventional baffle plates 38 which cover only one side of the stack. The fuel plenum 304 may be disposed below the stack 300 and may be configured to provide a hydrogen-containing fuel feed to the stack 300, and may receive an anode fuel exhaust from the stack 300. The fuel plenum 304 may be connected to fuel inlet and outlet conduits 308 which are located below the fuel plenum 304.

Each interconnect 400 electrically connects adjacent fuel cells 310 in the stack 300. In particular, an interconnect 400 may electrically connect the anode electrode of one fuel cell 310 to the cathode electrode of an adjacent fuel cell 310. As shown in FIG. 3C, each interconnect 400 may be configured to channel air in a first direction A, such that the air may be provided to the cathode of an adjacent fuel cell 310. Each interconnect 400 may also be configured to channel fuel in a second direction F, such that the fuel may be provided to the anode of an adjacent fuel cell 310. Directions A and F may be perpendicular, or substantially perpendicular. As such, the interconnects 400 may be referred to as cross-flow interconnects.

The interconnect 400 may include fuel holes that extend through the interconnect 400. The fuel holes are configured for fuel distribution. For example, the fuel holes may include one or more fuel inlets 402 and one or more fuel outlets 404, which may also be referred to as anode exhaust outlets 404. The fuel inlets and outlets 402, 404 may be disposed outside of the perimeter of the fuel cells 310. As such, the fuel cells 310 may be formed without corresponding through holes for fuel flow. The combined length of the fuel inlets 402 and/or the combined length of the fuel outlets 404 may be at least 75% of a corresponding length of the interconnect 400 e.g., a length taken in direction A.

In one embodiment, each interconnect 400 contains two fuel inlets 402 separated by a neck portion 412 of the interconnect 400, as shown in FIG. 3B. However, more than two fuel inlets 402 may be included, such as three to five inlets separated by two to four neck portions 412. In one embodiment, each interconnect 400 contains two fuel outlets 404 separated by a neck portion 414 of the interconnect 400, as shown in FIG. 3B. However, more than two fuel outlets 404 may be included, such as three to five outlets separated by two to four neck portions 414.

The fuel inlets 402 of adjacent interconnects 400 may be aligned in the stack 300 to form one or more fuel inlet risers 403. The fuel outlets 404 of adjacent interconnects 400 may be aligned in the stack 300 to form one or more fuel outlet risers 405. The fuel inlet riser 403 may be configured to distribute fuel received from the fuel plenum 304 to the fuel cells 310. The fuel outlet riser 405 may be configured to provide anode exhaust received from the fuel cells 310 to the fuel plenum 304.

Unlike the flat related art side baffles 38 of FIG. 1A, the side baffles 302 may be curved around edges of the interconnects 400. In particular, the side baffles 302 may be disposed around the fuel inlets 402 and outlets 404 of the interconnects 400. Accordingly, the side baffles may more efficiently control air flow through air channels of the interconnects 400, which are exposed between the side baffles 302 and are described in detail with regard to FIGS. 4A and 4B.

In various embodiments, the stack 300 may include at least 30, at least 40, at least 50, or at least 60 fuel cells, which may be provided with fuel using only the fuel risers 403, 405. In other words, as compared to a conventional fuel cell system, the cross-flow configuration allows for a large number of fuel cells to be provided with fuel, without the need for ASP's or external stack fuel manifolds, such as external conduits 32, 34 shown in FIG. 1A.

Each interconnect 400 may be made of or may contain electrically conductive material, such as a metal alloy (e.g., chromium-iron alloy) which has a similar coefficient of thermal expansion to that of the solid oxide electrolyte in the cells (e.g., a difference of 0-10%). For example, the interconnects 400 may comprise a metal (e.g., a chromium-iron alloy, such as 4-6 weight percent iron, optionally 1 or less weight percent yttrium and balance chromium alloy), and may electrically connect the anode or fuel-side of one fuel cell 310 to the cathode or air-side of an adjacent fuel cell 310. An electrically conductive contact layer, such as a nickel contact layer (e.g., a nickel mesh), may be provided between anode and each interconnect 400. Another optional electrically conductive contact layer may be provided between the cathode electrodes and each interconnect 400.

Figure 4A:
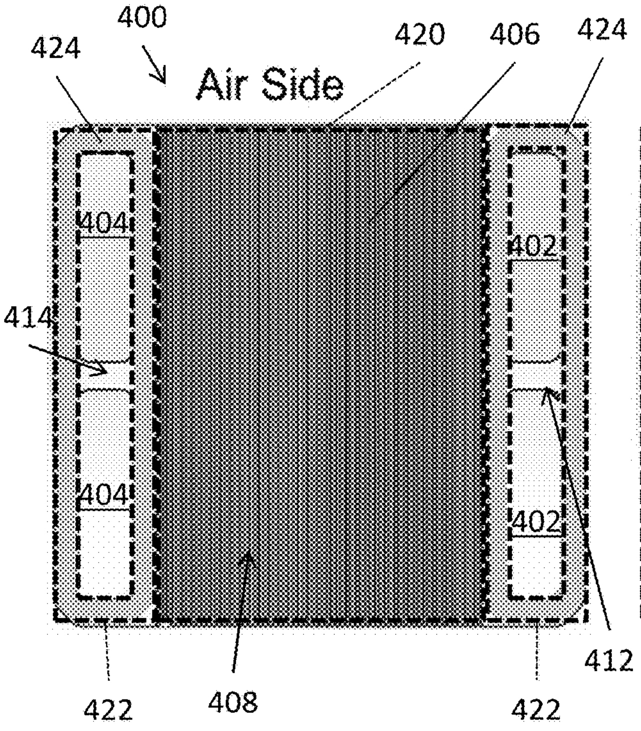
FIGS. 4A and 4B are plan views showing, respectively, an air side and a fuel side of the cross-flow interconnect of FIG. 3C, according to various embodiments of the present disclosure.
Figure 4B:
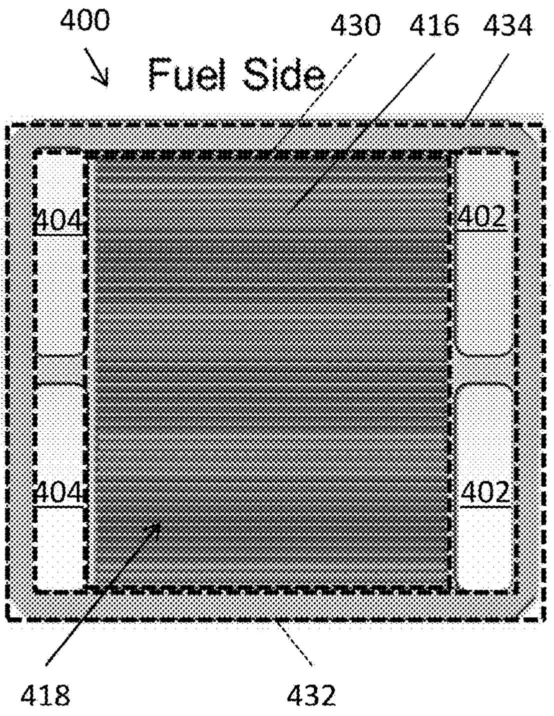

FIGS. 4A and 4B are plan views showing, respectively, an air side and a fuel side of the cross-flow interconnect 400, according to various embodiments of the present disclosure. Referring to FIG. 4A, the air side of the interconnect 400 may include ribs 406 configured to at least partially define air channels 408 configured to provide air to the cathode of a fuel cell 310 disposed thereon. The air side of the interconnect 400 may be divided into an air flow field 420 including the air channels 408, and riser seal surfaces 422 disposed on two opposing sides of the air flow field 420. One of the riser seal surfaces 422 may surround the fuel inlets 402 and the other riser seal surface 422 may surround the fuel outlets 404. The air channels 408 and ribs 406 may extend completely across the air side of the interconnect 400, such that the air channels 408 and ribs 406 terminate at opposing peripheral edges of the interconnect 400. In other words, when assembled into a stack 300, opposing ends of the air channels 408 and ribs 406 are disposed on opposing (e.g., front and back) outer surfaces of the stack, to allow the blown air to flow through the stack. Therefore, the stack may be externally manifolded for air.

Riser seals 424 may be disposed on the riser seal surface 422. For example, one riser seal 424 may surround the fuel inlets 402, and one riser seal 424 may surround the fuel outlets 404. The riser seals 424 may prevent fuel and/or anode exhaust from entering the air flow field 420 and contacting the cathode of the fuel cell 310. The riser seals 424 may also operate to prevent fuel from leaking out of the fuel cell stack 100 (see FIG. 3A).

Referring to FIG. 4B, the fuel side of the interconnect 400 may include ribs 416 that at least partially define fuel channels 418 configured to provide fuel to the anode of a fuel cell 310 disposed thereon. The fuel side of the interconnect 400 may be divided into a fuel flow field 430 including the fuel channels 418, and a perimeter seal surface 432 surrounding the fuel flow field 430 and the fuel inlets and outlets 402, 404. The ribs 416 and fuel channels 418 may extend in a direction that is perpendicular or substantially perpendicular to the direction in which the air-side channels 408 and ribs 406 extend.

A frame-shaped perimeter seal 434 may be disposed on the perimeter seal surface 432. The perimeter seal 434 may be configured to prevent air entering the fuel flow field 430 and contacting the anode on an adjacent fuel cell 310. The perimeter seal 434 may also operate to prevent fuel from exiting the fuel risers 403, 405 and leaking out of the fuel cell stack 300 (see FIGS. 3A and 3B).

The seals 424, 434 may comprise a glass or ceramic seal material. The seal material may have a low electrical conductivity. In some embodiments, the seals 424, 434 may be formed by printing one or more layers of seal material on the interconnect 400, followed by sintering.

Figure 4C:
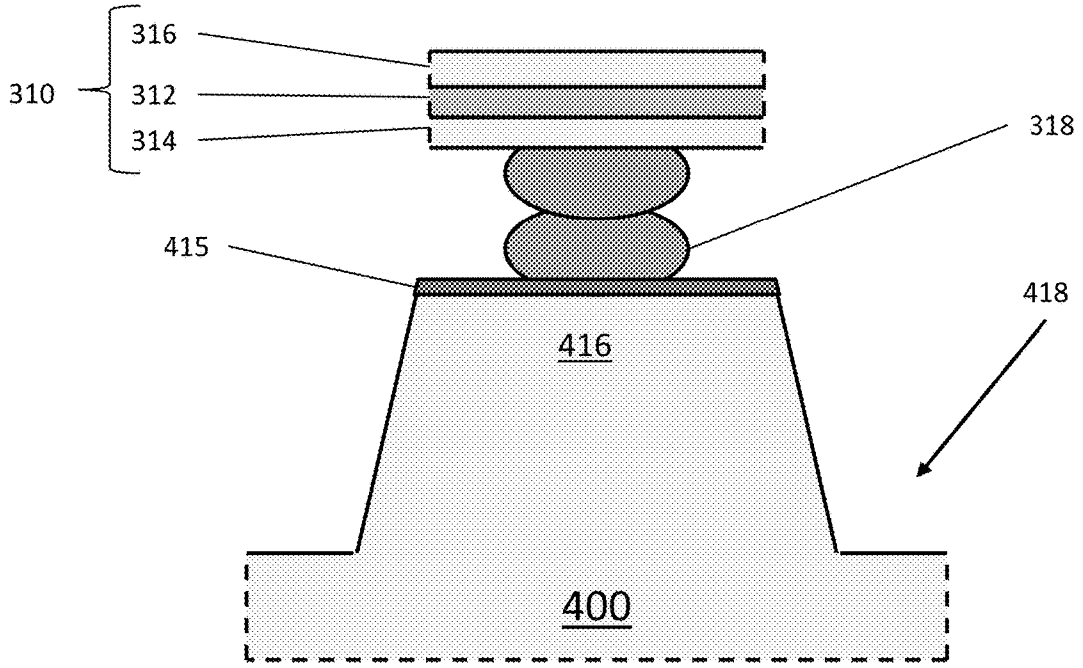
FIG. 4C is a sectional view of a fuel-side rib of an interconnect and an anode of an adjacent fuel cell, according to various embodiments of the present disclosure.

FIG. 4C is a sectional view illustrating one of the fuel-side ribs 416 of the interconnect 400 and the anode 314 of an adjacent fuel cell 310, according to various embodiments of the present disclosure. Referring to FIG. 4C, the interconnect 400 is electrically connected to the anode 314 by a Ni mesh 318 covering the fuel side of the interconnect 400. The Ni mesh 318 may operate as a current collector with respect to the anode 7. Although only one fuel-side rib 416 is shown, each fuel-side rib 416 of the interconnect 400 may be connected to the anode 314 in a similar manner.

Conventionally, oxides or other contaminants may form over time on the surface of an interconnect, and in particular, at an interface between a Ni mesh and corresponding ribs of the interconnect. As such, the contact resistance between the Ni mesh and an interconnect may increase, which may reduce the useful life of a fuel cell stack.

Referring again to FIG. 4C, the interconnect 400 may include a contact layer 415 configured to prevent or reduce such an increase in contact resistance. In particular, the contact layer 415 may be formed on the tips of the ribs 416. For example, the contact layer 415 may be disposed at an interface between the interconnect 400 and the Ni mesh 318 (e.g., between the rib 416 and the Ni mesh 318). In some embodiments, the contact layer 415 may cover substantially all of the upper (e.g., distal) surface of the rib 416. However, in other embodiments, the contact layer 415 may cover only a portion of the tip of the rib 416.

The contact layer 415 may have a higher iron content than the interconnect 400. For example, the contact layer 415 may have greater than 7 wt % iron, such as from about 10 to about 95 wt % iron, or about 20 to about 80 wt % iron, while the interconnect 400 may include an alloy having from about 4 to about 6 wt % iron. Accordingly, the contact layer 415 may operate to prevent oxide growth at the interface between the rib 416 and the Ni mesh 318. The contact layer 415 may also improve the metallurgical joining of the Ni mesh 318 and the interconnect 400.

In some embodiments, the thickness (e.g., depth) and/width of the contact layer 415 may be controlled to reduce mechanical distortion of the interconnect 400. For example, the thickness of the contact layer 415 may range from about 5 to about 1000 μm. The contact layer 415 may have an iron to chromium ratio that varies in the thickness direction thereof. For example, the iron to chromium ratio may decrease as a distance from the tip of the rib 416 increases.

According to various embodiments, the contact layer 415 may be formed by depositing an iron-based material, such as metallic iron or iron oxide, on the tips of the ribs 416. The interconnect 400 can then be sintered, such that the iron and chromium in the interconnect at least partially inter-diffuse, thereby creating the contact layer 415. In particular, iron of the contact layer 415 may partially diffuse into the tip of the rib 416, and chromium of the interconnect 400 may partially diffuse into the contact layer 415.

In some embodiments, the contact layer 415 may be formed by disposing iron wire on the tips of the ribs 416. The interconnect 400 may then be sintered to facilitate iron and chromium inter-diffusion, as described above. The iron wire may have a thickness (e.g., diameter) ranging from about 10 to 300 microns, such as from about 15 to about 250 microns, or from about 20 to about 200 microns.

In some embodiments, the iron wire may be deposited on an interconnect powder, and the resultant structure may be compressed into the shape of an interconnect, followed by sintering. In other embodiments, the iron wire may be deposited on a compressed interconnect, and the resultant structure may then be sintered.

In some embodiments, the contact layer 415 may be formed by contacting an iron powder to the tip of the rib 416. The iron powder may have an average particle size ranging from about 20 to about 400 microns, such as from about 25 to about 350 microns, or from about 30 to about 300 microns. In some embodiments, the iron powder may be deposited on an interconnect powder, and the resultant structure may be compressed into the shape of an interconnect, followed by sintering. Alternatively, the iron powder and the interconnect powder may be comprised and sintered at the same time using spark plasma sintering, as described in more detail below. For example, the interconnect powder may be deposited into a die cavity using a first shoe, and then the iron powder may then be deposited onto the interconnect powder using a second shoe or by a spraying process.

In other embodiments, the iron powder may be deposited on a compressed interconnect, or the compressed interconnect may be placed onto the iron powder ribs down, and the resultant structure may then be sintered. Methods of forming interconnects will be discussed in more detail below.

Figure 4D:
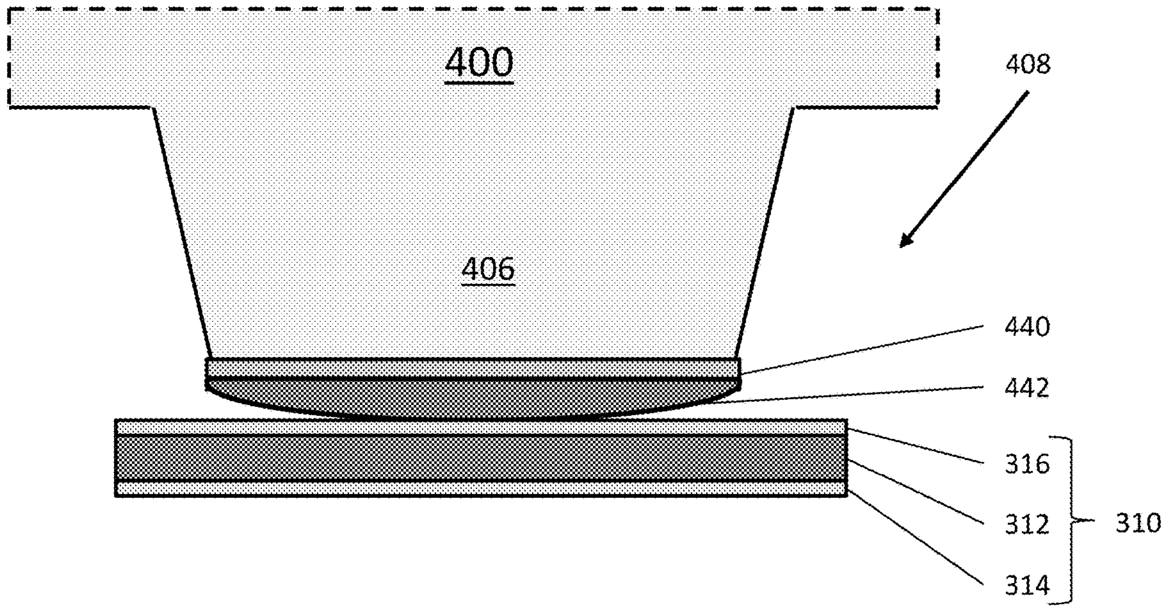
FIG. 4D is a sectional view of a fuel cell connected to the air side of an interconnect, according to various embodiments of the present disclosure.

FIG. 4D is a sectional view of a fuel cell 310 connected to the air side of an interconnect 400, according to various embodiments of the present disclosure. Referring to FIG. 4D, a protective coating or layer 440 may be disposed on the air side of the interconnect 400, and a cathode contact layer (CCL) 442 may be disposed on the coating 440. In some embodiments, the protective coating 440 and/or the CCL 442 may be deposited only on the tops of the cathode side ribs 406, without depositing the protective coating 440 and/or the CCL 442 in the oxidant (e.g., air) channels 408 (i.e., without depositing the coating 440 and/or the CCL 442 on or over the sidewalls of the ribs 406 and/or without depositing the coating 440 and/or the CCL on or over the bottom of the oxidant channels 408).

The coating 440 may be configured to limit the diffusion of chromium ions (e.g., Cr') from the interconnect 400 and into cathode 316 and into seals 424. The coating 440 may also be configured to suppress the formation of the native oxide on the surface of the interconnect 400. The native oxide is formed when oxygen reacts with chromium in the interconnect alloy to form a relatively high resistance layer of $Cr_2O_3$. If the interconnect coating 440 can suppress the transport of oxygen and water vapor from the air to the surface of the interconnect 400, then the kinetics of oxide growth can be reduced.

According to various embodiments, the coating 440 may include a metal oxide spinel material, such as a manganese cobalt oxide (MCO) spinel material and/or a perovskite material, such as lanthanum strontium manganite (LSM). In an embodiment, the MCO spinel material encompasses the compositional range from $Mn_2CoO_4$ to $Co_2MnO_4$. That is, any spinel material having the composition $Mn_{2-x}Co_{1-x}O_4$ ($0 \leq x \leq 1$) or written as $z(Mn_3O_4)+(1-z)(Co_3O_4)$, where ($1/3 \leq z \leq 2/3$) or written as $(Mn, Co)_3O_4$ may be used, such as $Mn_{1.5}Co_{1.5}O_4$, $MnCo_2O_4$ or $Mn_2CoO_4$. The coating 440 may also be a mixed layer of MCO and LSM. Many of the spinels that contain transition metals exhibit good electronic conductivities and reasonably low anion and cation diffusivities and are therefore suitable coating materials. Examples of such materials may be found in U.S. Published Patent Application No. 2013/0230792 and U.S. Pat. No. 9,452,475, which are incorporated herein by reference in their entirety.

The CCL 442 may be an electrically conductive metal oxide layer configured to improve an electrical connection between the interconnect 400 and the cathode 316. In some embodiments, the CCL 442 may include metal oxide materials that have a low cation diffusivity in the perovskite family, such as a lanthanum strontium oxide, e.g., $La_{1-x}Sr_xMnO_3$ (LSM), where $0.1 \leq x \leq 0.3$, such as $0.1 \leq x \leq 0.2$. In the case of LSM, the material has high electronic conductivity yet low anion and cation diffusion. Other perovskites such as $La_{1-x}Sr_xFeO_{3-d}$, $La_{1-x}Sr_xCoO_{3-d}$, and $La_{1-x}Sr_xCo_{1-y}Fe_yO_{3-d}$ all exhibit high electronic conduction and low cation conduction (low chromium diffusion rates) and may be used as the CCL 442.

Such materials generally have sintering temperatures of more than 1000° C. However, such temperatures may result in the oxidation of metal alloys included in the interconnect 400. As such, it may be difficult to properly sinter a CCL 442.

In view of the above and/or other problems, the CCL 442 may include a sintering aid configured to increase the density of the CCL 442 and to improve interfacial strength, and increase layer bonding. In some embodiments, the CCL 442 may include a glass material as a sintering aid. The glass material may be included at an amount less than about 15 wt %, such as from about 1 to about 10 wt %, such as from about 4 to about 10 wt %, with the remainder of the CCL 442 being a conductive perovskite metal oxide, such as LSM. In particular, glass amounts of greater that about 15 wt % may unnecessarily reduce the conductivity of the CCL 442.

In addition to better sintering, the addition of the glass material may make the CCL 442 more compliant and tolerant to mechanical stresses induced by thermal cycles during SOFC operation. As such, the glass material may be selected from glass materials that have a relatively low glass transition (Tg) or softening temperature, to avoid crystallization. In particular, the glass material may have a Tg or softening temperature that is low enough to allow the glass material to remain viscous at temperatures below 1000° C., such as temperatures of from about 400 to about 900° C. In some embodiments, selected glass materials may have a glass transition temperature of 900° C. or less, such as 825° C. or less, such as ranging from about 450 to about 550° C. For example, the glass material may remain viscous at fuel cell operating temperatures ranging from about 800 to about 900° C., such as from about 830 to about 860° C. Remaining viscous at such temperatures allows the CCL 442 to conform to the tops of the air-side ribs of the interconnect 400. Accordingly, the CCL 442 allows for improved coverage of rib tops, an increased effective contact surface area, reduced degradation, and the ability to self-heal cracks formed during thermal cycling.

According to various embodiments, the glass material may be selected from various compositions, such as alumino-silicate, boro-silicate, boro-aluminate, and alkali-free compositions, and may include Al, Si, Ca, Ba, B, La, Sr, Mg, or mixtures thereof.

Interconnect Formation Using Spark Plasma Sintering

Conventionally, an interconnect may be formed by multiple separate processes, which may be performed in different apparatuses and/or in different manufacturing facilities. For example, conventional interconnect formation may include separate power cold pressing, pressed green interconnect sintering, sintered interconnect oxidation to fill internal pores in the interconnect, oxidized interconnect grit blasting to remove the chromium oxide from its surfaces, and protective coating deposition processes. The cold pressing may require using a lubricant and/or binder in a pressed interconnect body powder to facilitate compaction and the formation of a green interconnect. The presence of the lubricant and/or binder may increase interconnect porosity and thus reduce interconnect density when the organic lubricant and/or binder are outgassed during or prior to sintering. In addition, the oxidation process may result in the formation of internal metal oxides, such as chromium oxide and/or iron oxide, within pores of an interconnect, which may reduce the thermal and/or electrical conductivity of the interconnect.

In view of the above and/or other drawbacks of conventional interconnect formation methods, one embodiment of the present disclosure provides an interconnect formation method that utilizes a spark plasma sintering (SPS) process in place of at least two (such as two, three or all four) of the conventional cold pressing, sintering, oxidation, and/or coating processes. For example, the SPS process combines the pressing and the sintering steps into a single process performed in the same SPS apparatus. The SPS process, which may also be referred to as direct current sintering, field-assisted sintering and/or as pulsed electric current sintering, may utilize electric heating to soften an interconnect material. This heating may reduce an amount of force needed to plastically deform an interconnect material, and may also allow for a higher degree of interconnect densification, as compared to the conventional formation method.

In addition, in one embodiment, the SPS process may allow for the production of high-density interconnects, without forming internal chromium oxide and/or iron oxide, which may result in interconnects having a higher thermal and electrical conductivity than interconnects produced by conventional formation methods. Thus, the oxidation step may be omitted. Alternatively, the interconnect formed by SPS may still be oxidized if it is desired to further reduce its porosity. Furthermore, if the interconnect is coated with a metal oxide coating (e.g., lanthanum strontium manganate and/or manganese cobalt oxide spinel layer), then the coated interconnect may be oxidized after the SPS process to re-oxidize the coating in case the coating is reduced or partially reduced during the SPS process.

Further, in one embodiment, the SPS process may allow for the sintering of dissimilar materials, which may allow for the formation of well-adhered protective coatings on interconnects during the SPS process. Thus, in one embodiment, the interconnect powder and the protective coating powder are pressed and sintered together in the same SPS apparatus and process to produce the sintered interconnect having the protective coating on at least one side (e.g., on the air side). Alternatively, the protective coating may be formed on the air side of the interconnect after the interconnect is pressed and sintered using SPS. Thus, instead of adding the protective coating powder in addition to the interconnect body powder to the SPS die cavity, the protective coating 440 is formed separately (e.g., by plasma spraying or another coating method) on the sintered interconnect after the SPS process.

In another embodiment, the iron rich powder in added over or under the interconnect body powder in the SPS apparatus die cavity, and the above-described iron rich layer contact layer 415 is formed on the fuel side ribs 416 of the interconnect 400 during the SPS process.

Figure 5A:
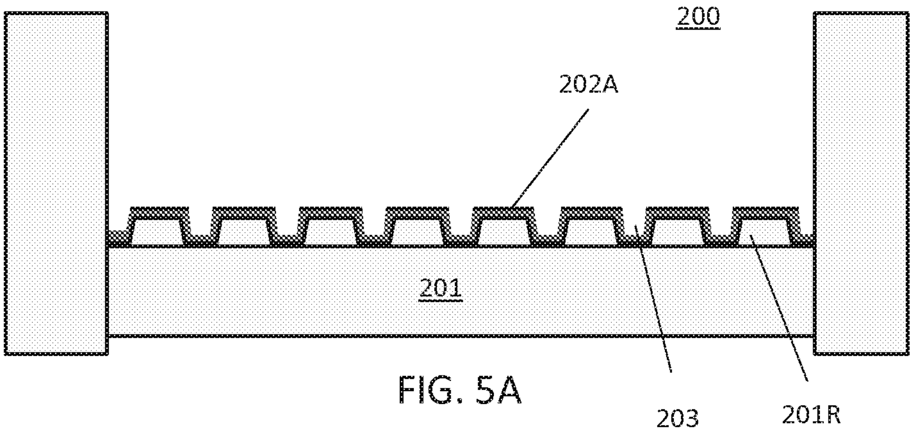
FIGS. 5A-5F illustrate a method of forming an interconnect, according to various embodiments of the present disclosure.

FIGS. 5A-5F illustrate an interconnect formation method that includes SPS, according to various embodiments of the present disclosure. Referring to FIG. 5A, the SPS apparatus 200 includes a lower punch 201 containing a die 203 (e.g., ribs which form the die cavity). An optional release layer 202A may be disposed in the die 203. The release layer 202A may be formed of an electrically conductive material having a high thermal stability. In some embodiments, the release layer 202A may be configured to conform with ribs 201R of the lower punch 201. The release layer 202A may comprise a graphite film or foil.

Figure 5B:
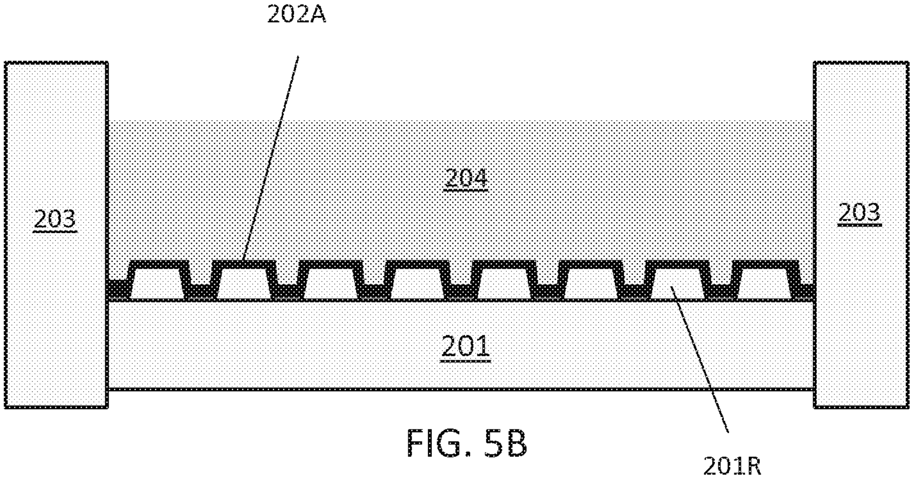

Referring to FIG. 5B, an interconnect body powder 204 may be loaded into the die 203, using a shoe or any other suitable method. The interconnect body powder 204 may include iron and chromium powders, or may include a chromium alloy powder (e.g., a Cr/Fe alloy powder including 4-6 wt % Fe and a remainder of Cr). In some embodiments, the interconnect body powder 204 may flattened and/or lightly compressed, in order to planarize the upper surface of the interconnect body powder 204.

In one embodiment, the iron rich powder (e.g., a powder containing from about 10 to about 95 wt. % iron powder and remainder (e.g., 5 to 90 wt. %) Cr powder, or a Fe—Cr alloy powder containing from about 10 to about 95 wt. % Fe and remainder (e.g., 5 to 90 wt. %) Cr) may be provided into the die 203 over the release layer 202A prior to loading the interconnect body powder 204 into the die 203.

In various embodiments, a lubricant may not be necessary to facilitate compaction and may be omitted from the interconnect body powder 204. However, in other embodiments, the interconnect body powder 204 may optionally include a lubricant to facilitate compaction.

Figure 5C:
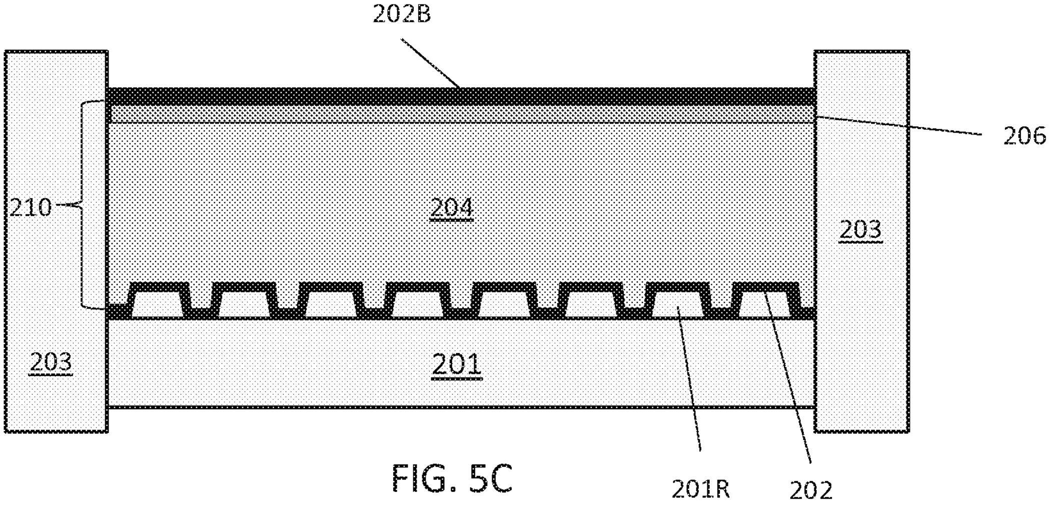

Referring to FIG. 5C, in one embodiment, a protective powder 206 may be deposited on the interconnect body powder 204. The protective powder 206 may be deposited using a shoe or another suitable method, and may include any of the protective layer materials described herein (e.g., MCO and/or LSM) usable for the protective layer 440. Accordingly, the die 203 may be loaded with a composite interconnect material 210 comprising a layer of the interconnect body powder 204 and a layer of the protective powder 206 and optionally a layer of iron rich powder. A second release layer 202B, as described above, may be disposed on top of the protective powder 206. Alternatively, the protective powder 206 may be omitted and the protective coating 440 is formed on the interconnect 400 after the SPS process using a separate coating process.

Figure 5D:
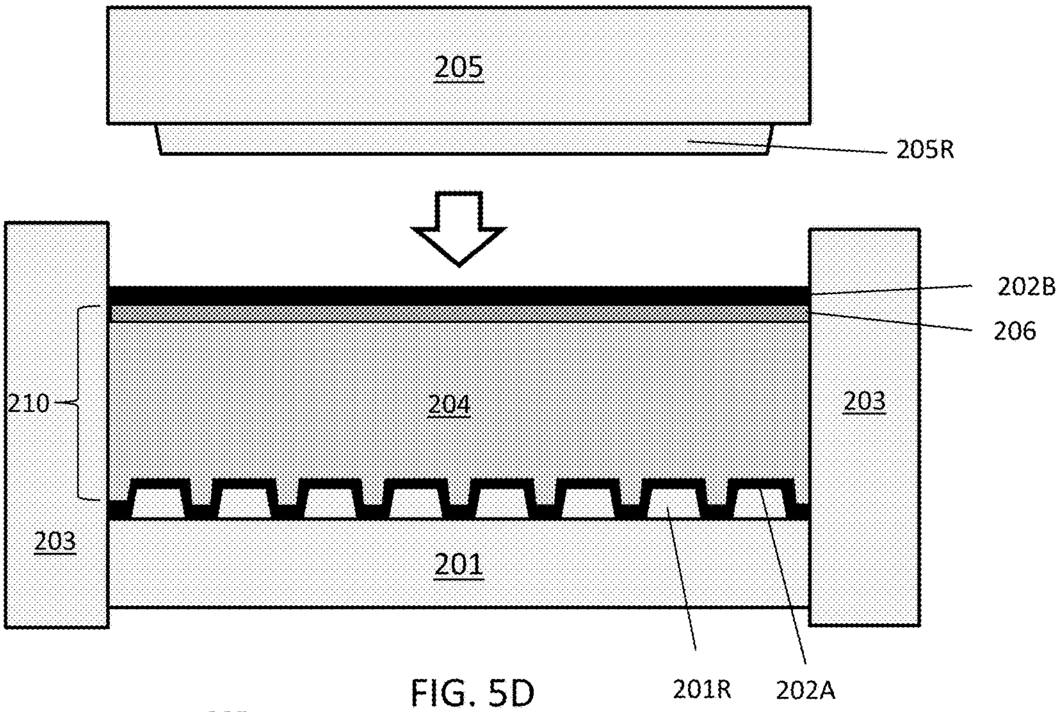

Referring to FIG. 5D, the composite interconnect material 210 may be compressed between an upper punch 205 and the lower punch 201. The upper punch 205 may contain upper punch ribs 205R (only one rib is shown in the cross sectional view of FIG. 5D). For a cross-flow interconnect shown in FIG. 3C, the upper punch ribs 205R may extend perpendicular to the lower punch ribs 201R, as shown in FIG. 5D. For a co-flow or counter-flow interconnect shown in FIGS. 2A and 2B, the upper punch ribs 205R may extend parallel to the lower punch ribs 201R. The lower punch 201, the die 203, and the upper punch 205 may be formed of a material configured to withstand high temperatures and/or pressures, such as graphite or the like.

Any suitable pressure, such as a pressure ranging from about 15 MPa to about 100 MPa, such as from about 20 MPa to about 70 MPa, or about 22 MPa to about 50 MPa may be applied to composite interconnect material 210. A controlled atmosphere may be maintained inside the die (i.e., die cavity) 203. For example, a vacuum atmosphere, a reducing (e.g., hydrogen) atmosphere, or an inert atmosphere, such as a nitrogen, argon, or helium atmosphere, may be maintained inside of the die 203 during the SPS process. In one embodiment, an initial pressure may be applied to the composite interconnect material 210 prior to applying a voltage to the composite interconnect material 210.

Figure 5E:
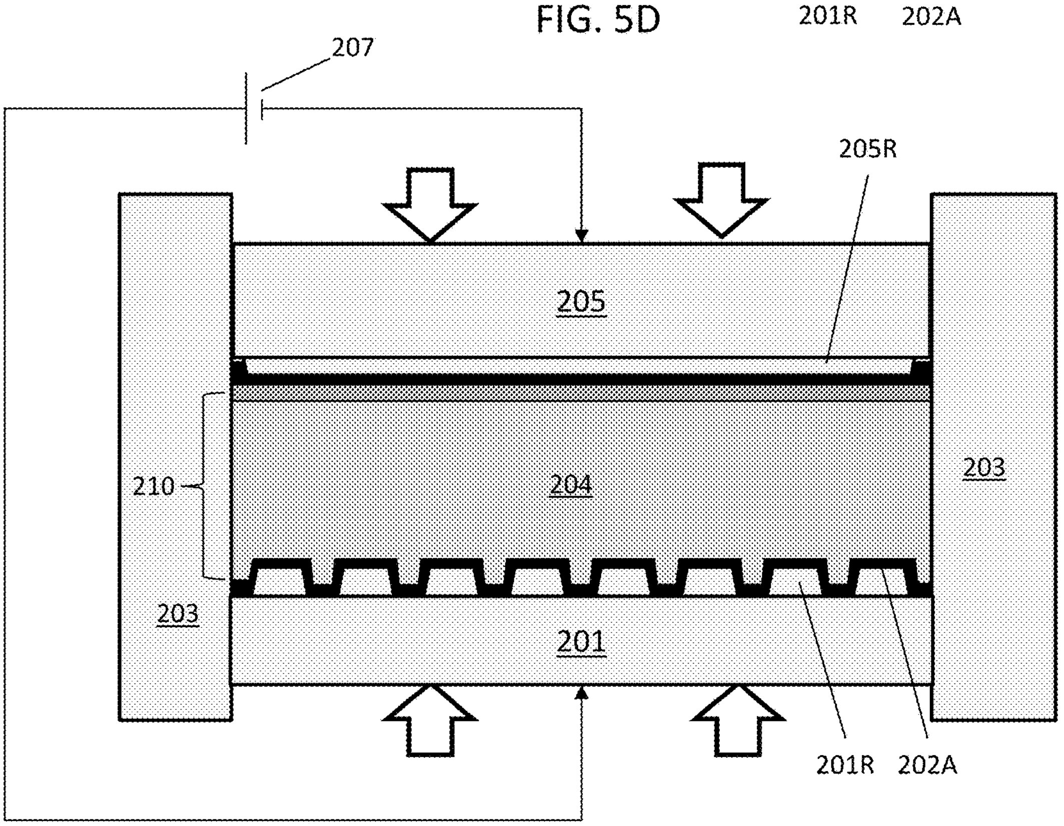

Referring to FIG. 5E, a power supply 207 may be used to apply a voltage, such as a pulsed or continuous DC voltage, between the upper punch 205 and the lower punch 201 to initiate the SPS process during the application of the pressure. In particular, in a first stage of the SPS process, the DC voltage may rapidly heat the particles of the composite interconnect material 410. The heating may be generated by conduction from the resistive heating of the punches 201 and 205, as well as resistive heating of the powder of the composite interconnect material 410 itself as current flows through the SPS die. The heating may result in at least partial fusion of the particles (e.g., the formation of "necks" between the particles). The first stage may be performed of a time period ranging from about 5 minutes to about 20 minutes, such as from about 10 minutes to about 15 minutes. In one embodiment, the pressure may be increased from the initial pressure at the beginning of and/or during the heating.

In a second stage of the SPS process, the DC voltage may result in Joule heating, due to current flow through the fused particles. In particular, the temperature of the composite interconnect material 410 may be increased to a sintering temperature ranging from about 1000° C. to about 1500° C., such as from about 1100° C. to about 1475° C., or about 1250° C. to 1450° C. In addition, the pressure applied to the composite interconnect material 210 by the punches 201, 205 may be increased to a pressure of at least 25 MPa, such as a pressure ranging from about 30 MPa to about 150 MPa, such as to about 40 MPa to about 80 MPa, or about 50 MPa to about 60 MPa.

Figure 5F:
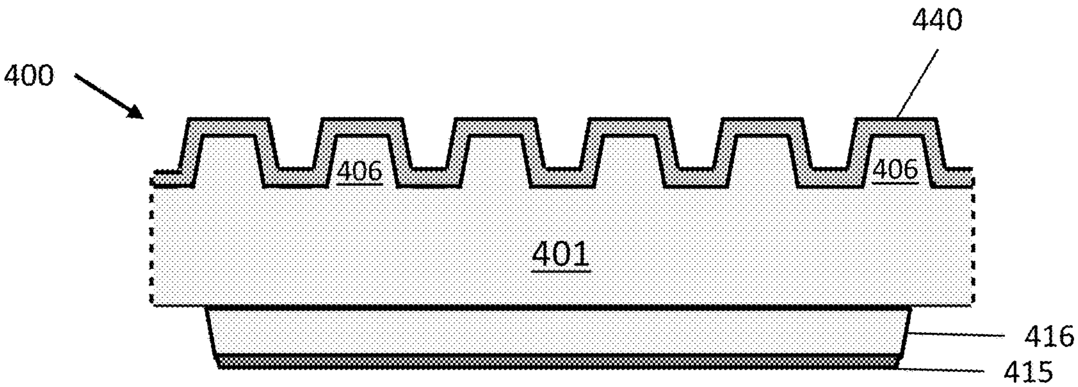

In a third stage of the SPS process, the sintering temperature and the pressure may be maintained until the composite interconnect material 210 is sufficiently sintered and/or densified to form a densified interconnect 400. For example, the applied heat and pressure may result in the plastic deformation and compaction of particles of the composite interconnect material 210, thereby forming a densified, sintered interconnect 400, as shown in FIG. 5F. For example, the temperature and pressure may be maintained for a time period ranging from about 15 minutes to about 45 minutes, such as from about 10 minutes to about 60 minutes, or about 20 to 40 minutes, depending on a desired amount of densification and/or sintering.

If the protective powder 206 was present in the die 203, then the sintered, densified interconnect 400 has a protective coating 440 on its air side. If the iron rich powder was present in the die, then the sintered, densified interconnect 400 has the iron rich contact layer 415 on its fuel side (e.g., on the fuel side ribs).

Referring to FIGS. 5E and 5F, the interconnect 400 may be removed from the die 203, and the release layers 202A, 202B may be removed. For example, a sand or grit blasting process may be performed to remove the release layers 202A, 202B from the interconnect 400. The interconnect body powder 204 may form a body 401 of the interconnect 400, and the protective powder 206 may form a protective layer 440 on the air side of the interconnect 400. Ribs 205R of the upper punch 205 and the ribs 201R of the lower punch 201 may be configured to form the air-side ribs 406 and the fuel side ribs 416 on the opposite sides of the interconnect body 401. The SPS process may result in the co-diffusion of the interconnect body powder 204 and the protective powder 206. As a result, the protective layer 440 may be tightly adhered to the air ribs 406 of the interconnect 400.

FIGS. 6A-6E illustrate a SPS process for forming an interconnect 400, according to an alternative embodiment of the present disclosure. The SPS process may be similar to the process of FIGS. 5A-5F. As such, only the difference therebetween will be discussed in detail. In this embodiment, the protective powder 206 is formed below the interconnect body powder 204 in the die 203.

Figure 6A:
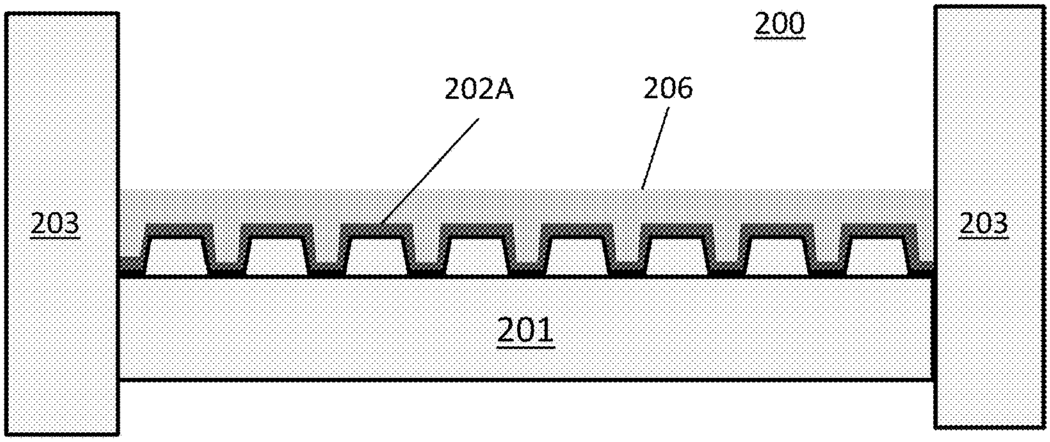
FIGS. 6A-6E illustrate an alternative method of forming an interconnect, according to various embodiments of the present disclosure.

Referring to FIG. 6A, a release layer 202A, such as a graphite sheet of foil, may be positioned in the die 203 on the lower punch 201. A protective powder 206 may be deposited on the release layer 202A.

Figure 6B:
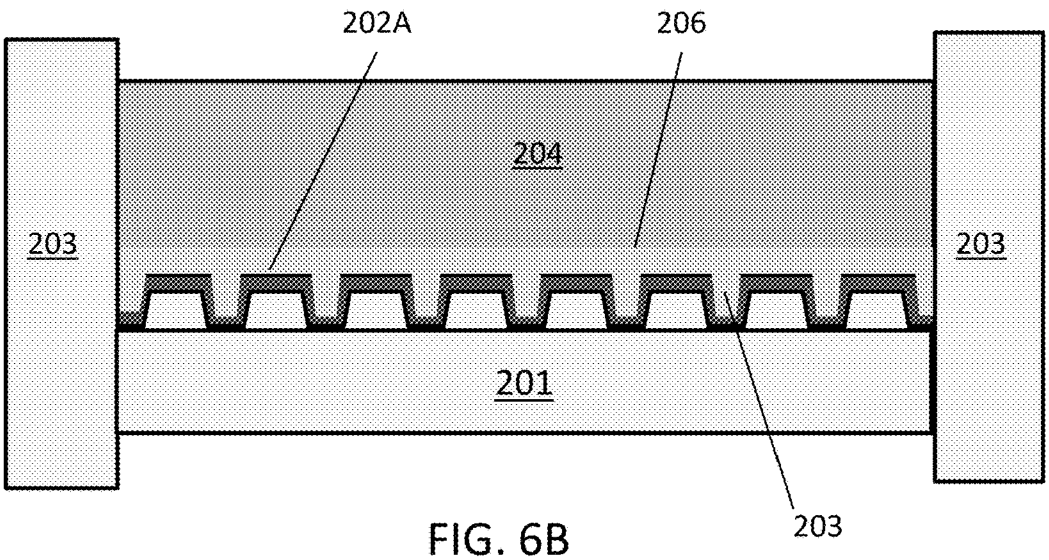

Referring to FIG. 6B, the interconnect body powder 204 may be loaded into the die 203 and on the protective powder 206.

Figure 6C:
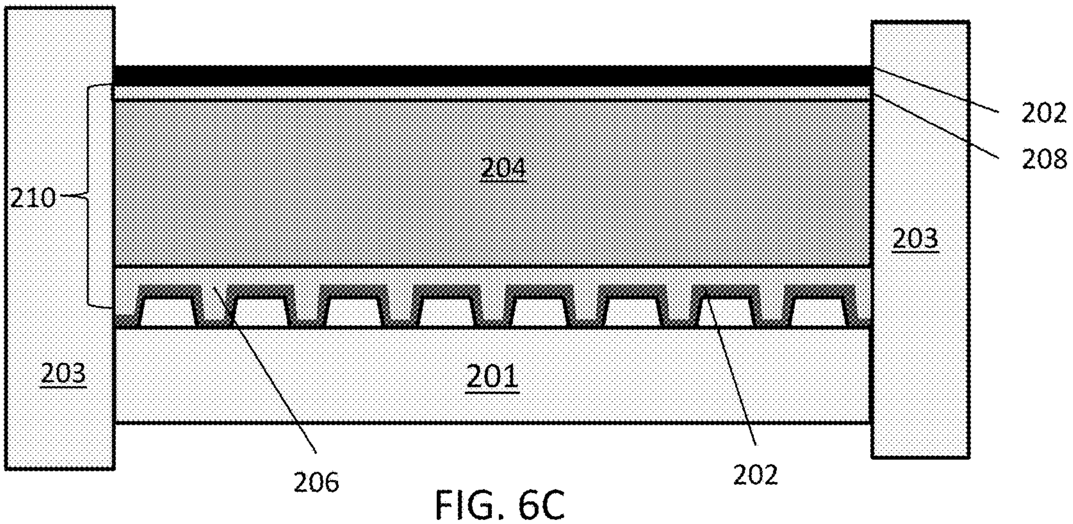

Referring to FIG. 6C, a contact material 208 may be optionally loaded on the interconnect body powder 204. The contact material 208 may be an iron-containing material, such as metallic iron or iron oxide, and may be in the form of a powder or a wire. The contact material 208 may be loaded as a continuous layer or as a discontinuous layer. For example, the contact material 208 may be loaded on areas of the interconnect body powder 204 that subsequently form tips of interconnect ribs. In one embodiment, the contact material 208 comprises iron rich powder (e.g., a powder containing from about 10 to about 95 wt. % iron powder and remainder Cr powder, or a Fe—Cr alloy powder containing from about 10 to about 95 wt. % Fe and remainder Cr). A release layer 202B may be disposed on top of the contact material 208. Accordingly, the die 203 may be loaded with a composite interconnect material 210 comprising a layer of the interconnect body powder 204, a layer of the protective powder 206, and a layer of the contact material 208.

The contact material 208 may be arranged, such that when the interconnect body powder 204 is compressed, the contact material 208 is disposed between ribs 205R of the upper punch 205. When in powder form, the contact material 208 may be deposited using a shoe, a spray deposition method, a screen-printing method, or the like.

Figure 6D:
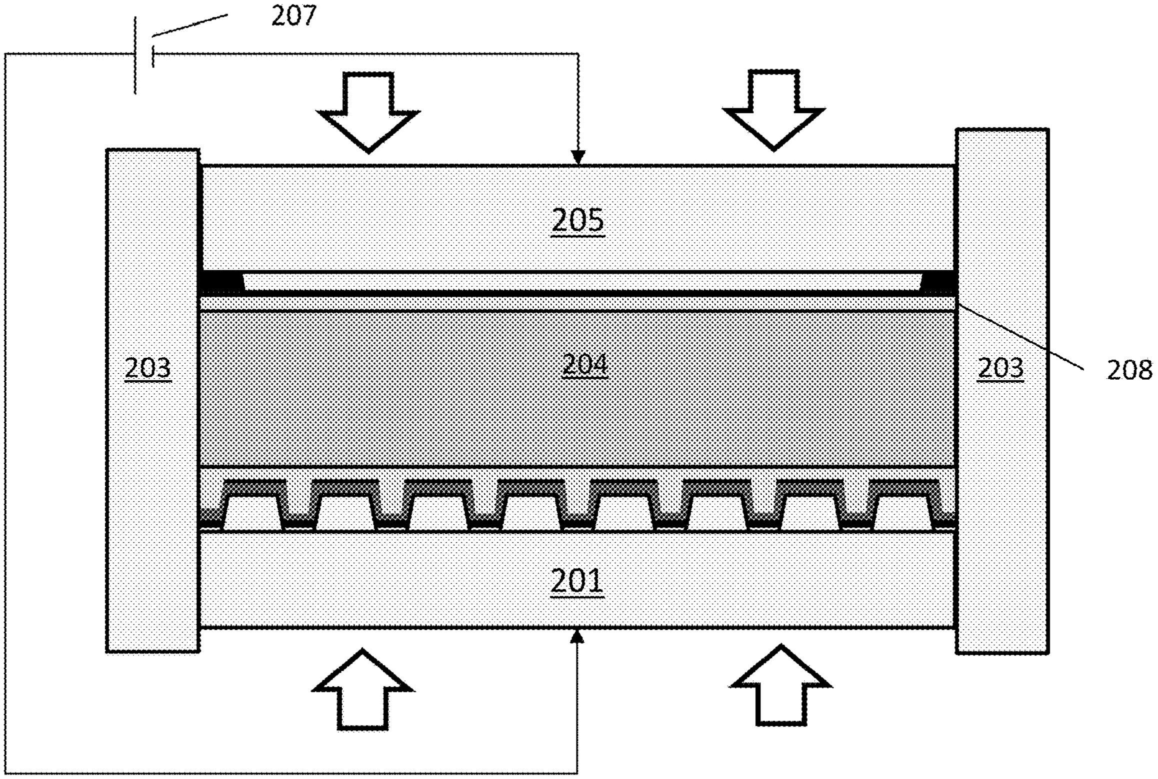

Referring to FIG. 6D, the powders may be compressed between the lower punch 201 and the upper punch 205. A SPS process may then be performed to sinter the powders and form the interconnect 400, as described above.

Figure 6E:
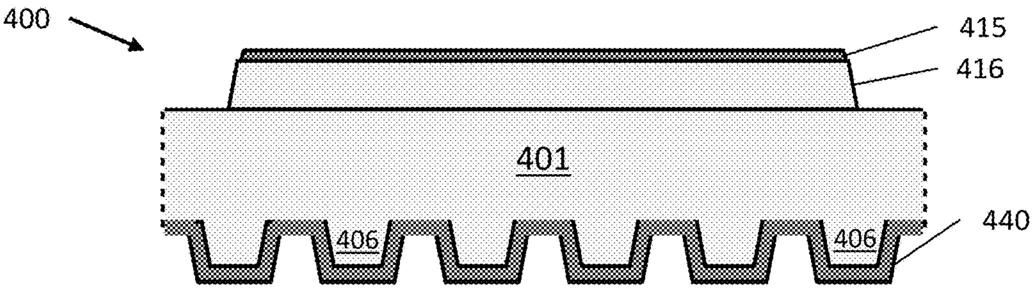

As shown in FIG. 6E, the release layers 202A, 202B may be removed to complete the interconnect 400 including the protective coating 440 on the air side and the contact layer 415 on the fuel side (e.g., on the tips of the fuel side ribs 416).

According to various embodiments, the above methods may be performed in an SPS powder pressing apparatus that allows for more than one interconnect to be formed at a time. For example, FIG. 7 illustrates a SPS apparatus 211 configured to produce multiple interconnects simultaneously.

Figure 7:
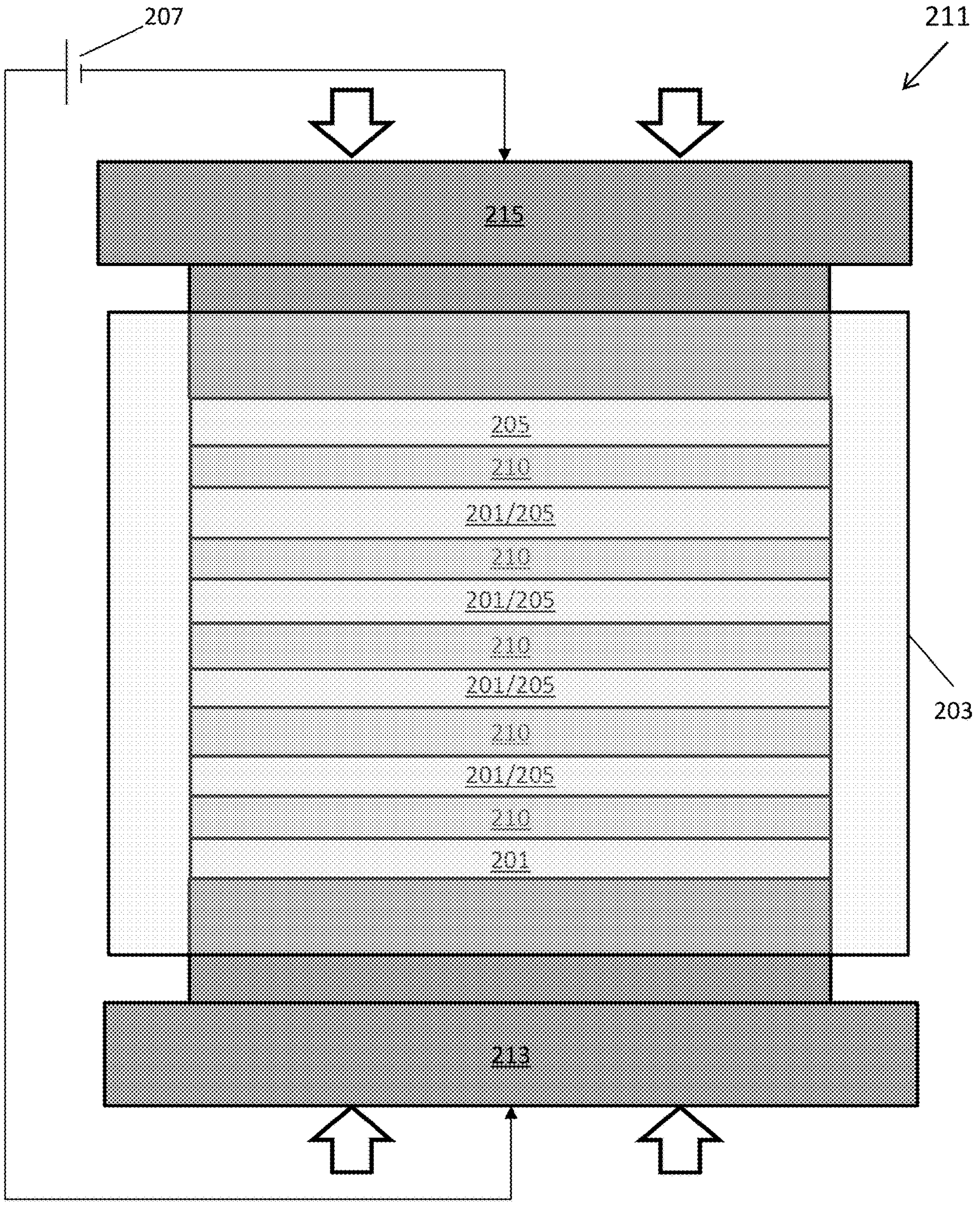
FIG. 7 illustrates an alternative method that may be utilized with the methods of FIGS. 5A-5F and FIGS. 6A-6E, according to various embodiments of the present disclosure.

Referring to FIG. 7, the apparatus 211 may include a die (i.e., die cavity) 203, a power supply 207, a lower ram 213 and an upper ram 215. The die 203 may be configured to receive multiple lower and upper punches 201, 205. In another embodiment, a single punch may be configured to make several interconnects in the same plane as well. If multiple interconnects or coplanar interconnects are stacked vertically, then an intermediate punch with air side and fuel side is used. A composite interconnect material 210, which may comprise the interconnect body powder and optionally the protective powder and/or the contact material as described above, may be loaded between each pair of the lower and upper punches 201, 205. Although not shown, release layers 202A, 202B may be used to separate layers of the composite interconnect material from the punches 201, 205.

The power supply 207 may be configured to apply a pulsed DC voltage to the composite interconnect material 210, and the lower and upper rams 213, 215 may be configured to apply pressure to the composite interconnect material 210, while the composite interconnect material 210 is heated by the applied voltage. Accordingly, the apparatus 211 may be configured to simultaneously produce multiple sintered interconnects 400, as shown in FIG. 5F or 6E.

In the prior embodiments, the interconnect 400 may be placed into a fuel cell stack, such as a solid oxide fuel cell stack. Fuel cell systems of the embodiments of the present disclosure are designed to reduce greenhouse gas emissions and have a positive impact on the climate. In alternative embodiments, the interconnect 400 may be placed into an electrolyzer stack, such as a solid oxide electrolyzer stack. Thus, the interconnect may be used in any suitable electrochemical device stack.

In one embodiment, if the oxidation step is omitted, then the interconnect 400 is not oxidized at a temperature above room temperature (e.g., between 100 and 900 degrees Celsius) between the SPS step and the step of placing the interconnect into the fuel cell or electrolyzer stack.

Figure 8A:
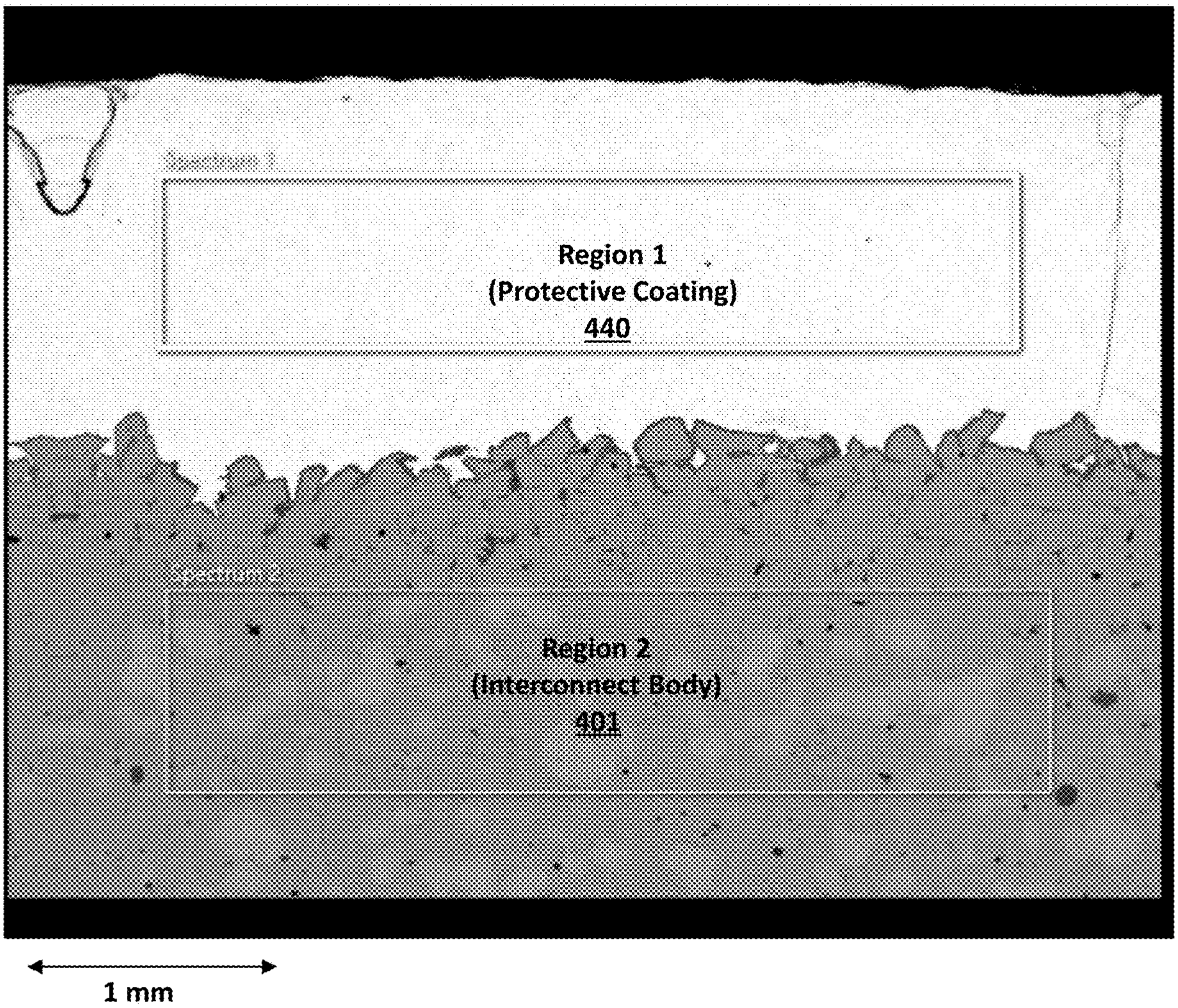
FIG. 8A is a cross-sectional micrograph showing an interconnect comprising a body formed of a chromium alloy and a protective coating formed of LSM, according to various embodiments of the present disclosure.
Figure 8B:
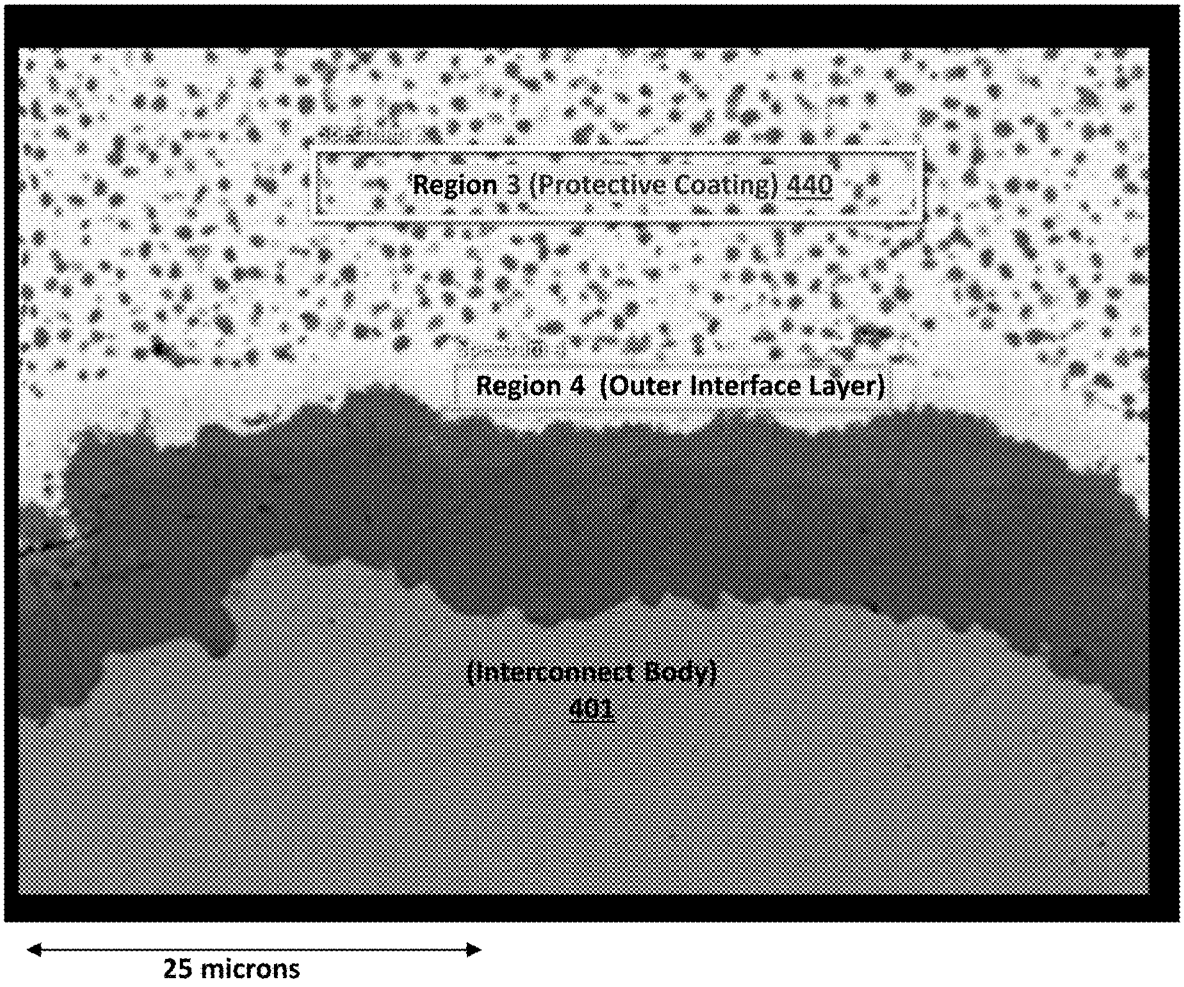
FIGS. 8B and 8C are higher magnification micrographs showing an interface region formed between the protective coating and the body of the interconnect of FIG. 8A.
Figure 8C:
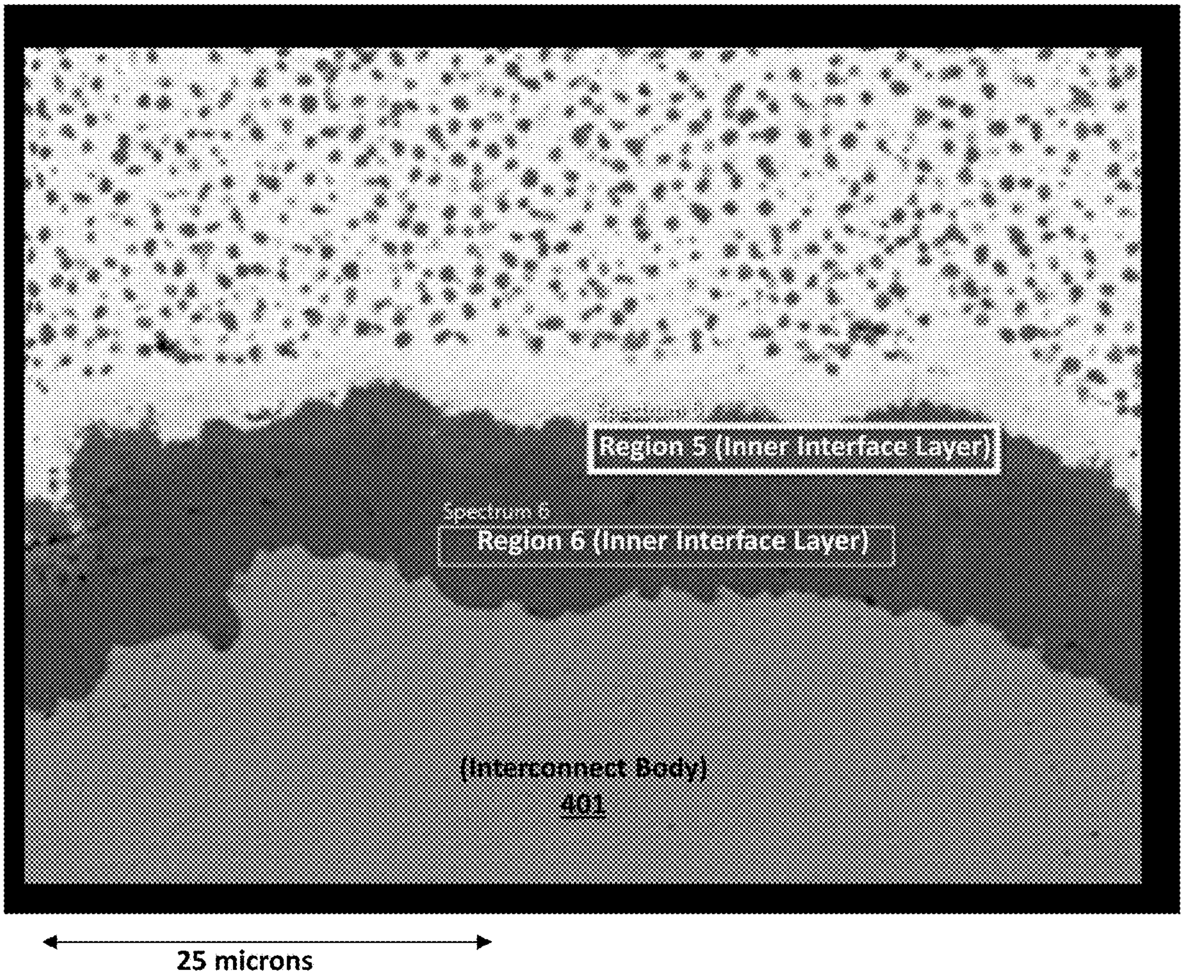

FIG. 8A is a cross-sectional micrograph showing an interconnect formed by SPS and comprising a body 401 formed of a chromium alloy and a protective coating 440 formed of LSM, according to various embodiments of the present disclosure. FIGS. 8B and 8C are higher magnification micrographs showing an interface region formed between the protective coating and the body of the interconnect of FIG. 8A.

Referring to FIG. 8A, energy dispersive X-ray spectroscopy (EDS) measurements were taken in Region 1, which was located in the protective coating 440, and in Region 2, which was located in the body 401 of the interconnect 400. The Region 1 measurements indicate that the sampled portion of the protective coating 440 was formed of LSM and did not include a detectable amount of chromium. The Region 2 measurements indicate that the sampled portion of the body was formed of an oxygen containing chromium-iron alloy and did not include a detectable amount of LSM.

Referring to FIG. 8B, Region 3 was located in a portion of the protective coating 440 adjacent to the interface region between the protective coating 440 and the body 401, and Region 4 was located in an outer layer of the interface region. The Region 3 results indicate that a very small about of chromium (0.6 wt. %) diffused into the sampled portion of the protective coating 440. The Region 4 results indicate that the outer layer of the interconnect body 401 contained LSM and a relatively small amount of chromium (6.4 wt. %) (e.g., likely a mix of LSM and chromium oxide).

Referring to FIG. 8C, Region 5 was located in an outer portion of an inner layer of the interface region, and Region 6 was located in an inner portion of the inner layer of the interface region. The Region 5 and 6 results indicated that chromium diffusion decreased in the inner layer of the interface region as distance from the interconnect body 401 increased. As such, the results indicate that inter-diffusion of interconnect body and protective coating materials occurred at the interface region. Thus, a chromium oxide interface layer formed between the interconnect body 401 and the protective coating 440.

Figure 9A:
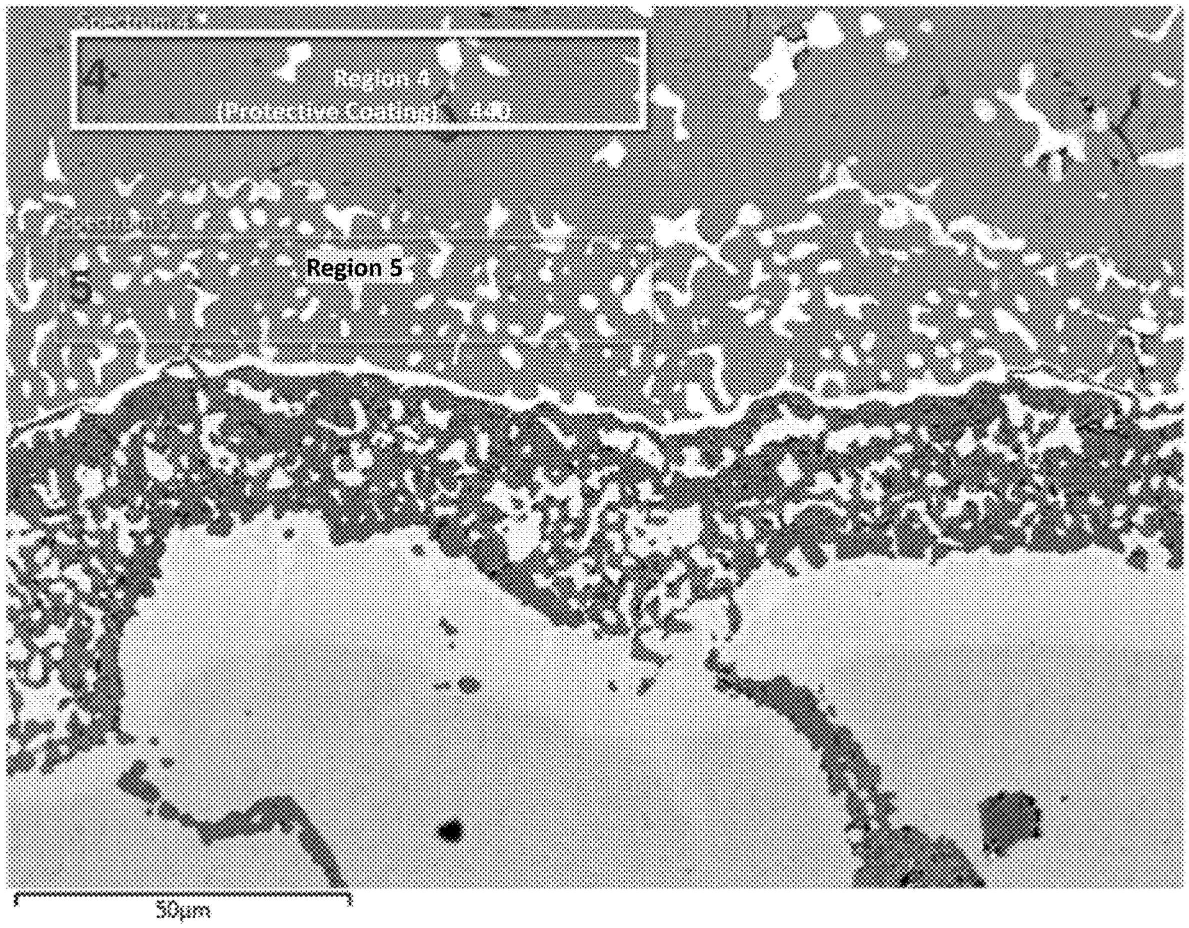
FIGS. 9A and 9B are cross-sectional micrographs showing an interconnect comprising a body formed of a chromium alloy and a protective coating formed of MCO using SPS in a vacuum atmosphere, according to various embodiments of the present disclosure.
Figure 9B:
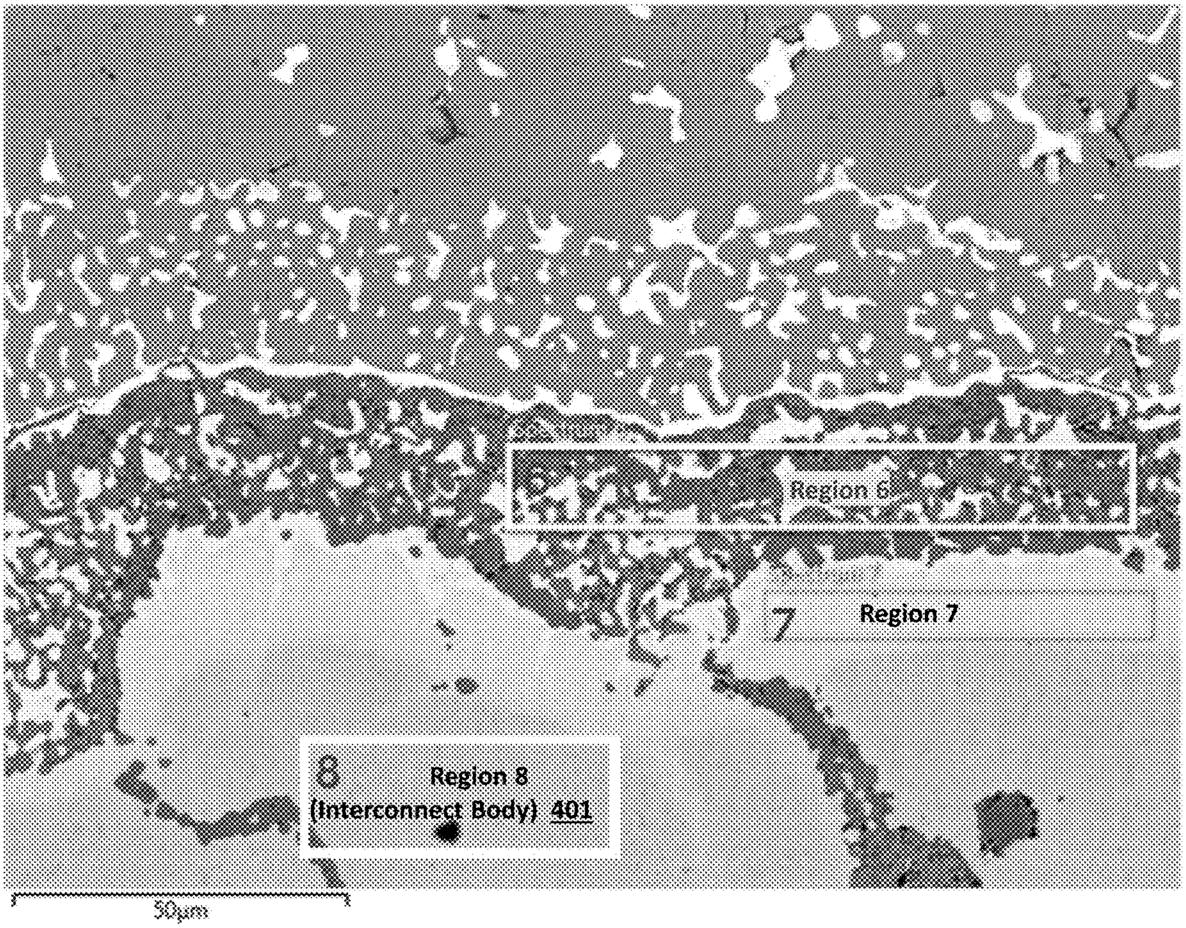

FIGS. 9A and 9B are cross-sectional micrographs showing an interconnect comprising a body formed of a chromium alloy and a protective coating formed of MCO using SPS in a vacuum atmosphere, according to various embodiments of the present disclosure. Referring to FIG. 9A, the MCO coating 410 in Regions 4 and 5 included between 50 and 68 wt. % manganese, between 30 and 39 wt. % cobalt, and between 9 and 12 wt. % oxygen. Less than 1 wt. % of respective chromium and iron diffused into the MCO coating 410. Referring to FIG. 9B, a significant amount of cobalt (e.g., between 18 and 29 wt. %) and some manganese diffused into the interfacial layers to form a chromium-cobalt-manganese oxide outer interface layer in Region 6 and a chromium-cobalt alloy inner interface layer in Region 7. However, no cobalt or manganese was detected in the interconnect body 401 in Region 8.

Figure 10A:
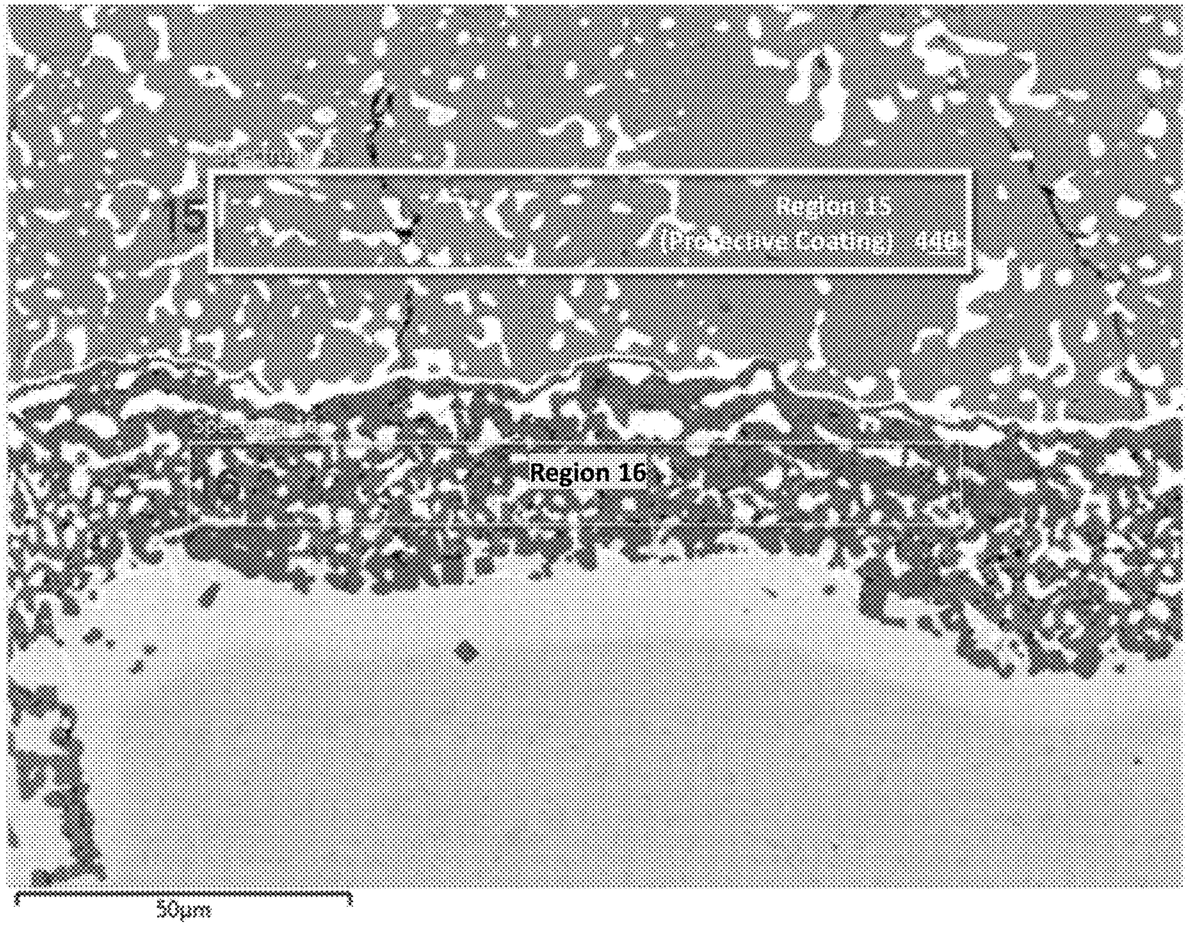
FIGS. 10A and 10B are cross-sectional micrographs showing an interconnect comprising a body formed of a chromium alloy and a protective coating formed of MCO using SPS in an argon atmosphere, according to various embodiments of the present disclosure.
Figure 10B:
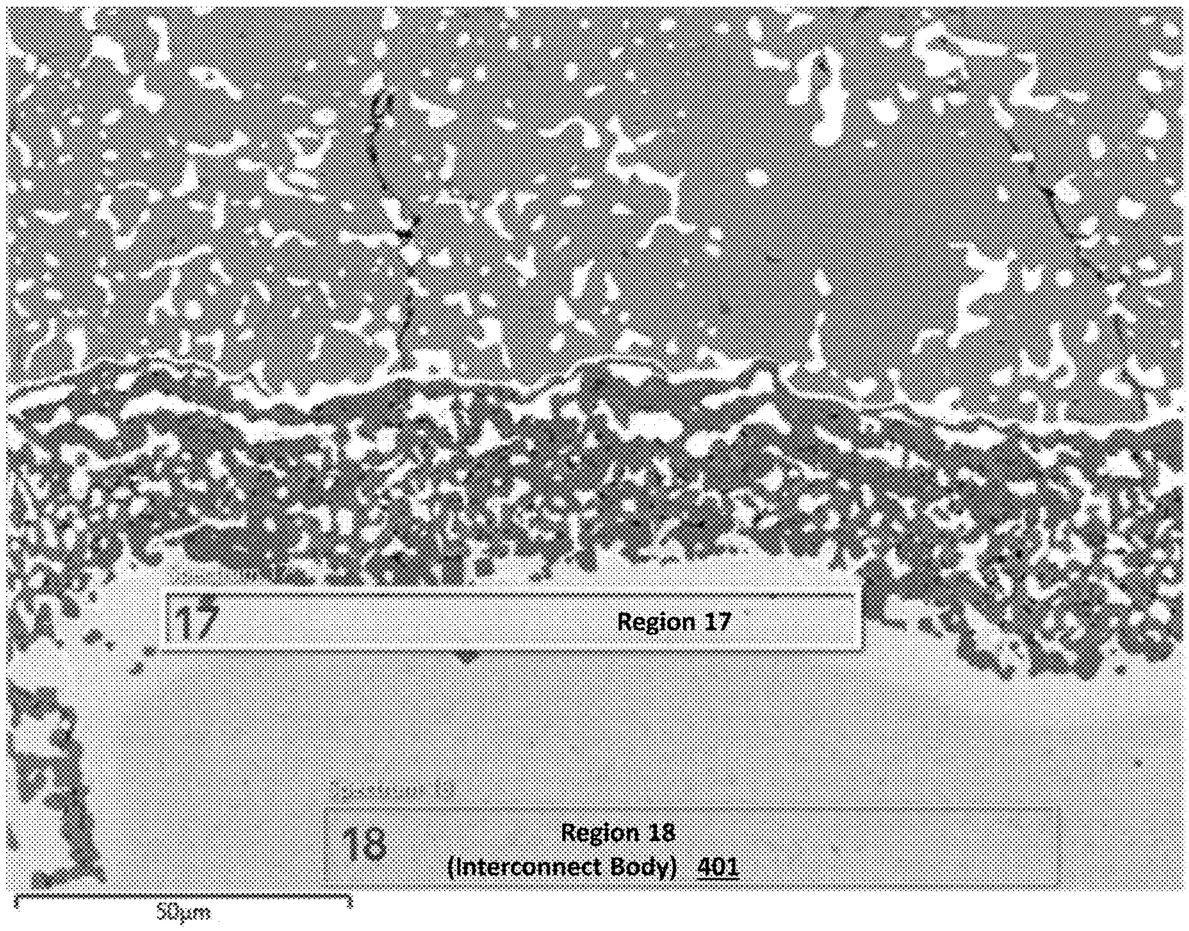

FIGS. 10A and 10B are cross-sectional micrographs showing an interconnect comprising a body formed of a chromium alloy and a protective coating formed of MCO using SPS in an argon atmosphere, according to various embodiments of the present disclosure. Similar results were obtained for the argon atmosphere sample as for the vacuum atmosphere sample shown in FIGS. 9A and 9B. The MCO coatings 410 exhibited improved adhesion and resistance to reduction compared to the LSM coatings 410.

According to various embodiments, interconnects that are formed by SPS can be compressed and sintered in one step in the same apparatus, thus simplifying the fabrication method. Furthermore, in some embodiments, contact layers and/or protective coatings may be formed on the interconnects during the SPS process without utilizing a separate coating process, such as plasma spraying, wet spraying or the like, which further simplifies the fabrication method. In some embodiments, the SPS process may form high density interconnects without utilizing an oxidation process. As such, the disclosed methods may also provide interconnects having a higher electric and/or thermal conductivity than interconnects formed by conventional methods. Accordingly, the disclosed methods may provide higher performance interconnects at a lower cost than conventional methods.

Although the foregoing refers to particular preferred embodiments, it will be understood that the invention is not so limited. It will occur to those of ordinary skill in the art that various modifications may be made to the disclosed embodiments and that such modifications are intended to be within the scope of the invention. All of the publications, patent applications and patents cited herein are incorporated herein by reference in their entirety.

What is claimed is:

1. A method of forming an interconnect for an electrochemical device cell stack, comprising:

loading a die containing a lower punch comprising upper ribs with an interconnect material comprising a first layer of interconnect body powder comprising chromium and iron over the upper ribs of the lower punch;

inserting an intermediate punch comprising upper ribs and lower ribs into the die such that the lower ribs of the intermediate punch face the first layer of interconnect body powder;

loading the die with additional interconnect material comprising a second layer of interconnect body powder comprising chromium and iron over the upper ribs of the intermediate punch;

inserting an upper punch comprising lower ribs into the die such that the lower ribs of the upper punch face the second layer of interconnect body powder; and spark plasma sintering (SPS) the interconnect material to form interconnects having air channels and fuel channels disposed on opposing air and fuel sides of each of the interconnects.

2. The method of claim 1, wherein:

the interconnect material comprises a composite interconnect material which further comprises a protective powder disposed above or below the interconnect body powder;

the protective powder comprises a metal oxide spinel material, a perovskite material, or a combination thereof; and the interconnects each comprise a protective layer disposed on the air side of the interconnect.

3. The method of claim 2, wherein the loading a die further comprises:

loading a first release layer into the die between the upper ribs of the lower punch and the interconnect body powder and the protective powder; and loading a second release layer into the die over the interconnect body powder and the protective powder.

4. The method of claim 3, wherein:

the interconnect body powder is disposed on the first release layer, and the protective powder is disposed on the interconnect body powder; and the second release layer is disposed on the protective powder.

5. The method of claim 3, wherein:

the protective powder is disposed on the first release layer, and the interconnect body powder is disposed on the protective powder; and the second release layer is placed on the interconnect body powder.

6. The method of claim 3, wherein the first and second release layers each comprise a graphite sheet or foil.

7. The method of claim 3, further comprising removing the first and second release layers from the interconnects after the SPS.

8. The method of claim 3, further comprising loading an iron rich contact powder in the die on an opposite side of the interconnect body powder from the protective powder.

9. The method of claim 8, wherein:

the interconnect body powder comprises 4 to 6 weight percent iron and 94 to 96 weight percent chromium;

the iron rich contact powder comprises 10 to 95 weight percent iron and 5 to 90 weight percent chromium; and an iron rich contact region is formed on fuel side ribs of the body of the interconnect.

10. The method of claim 2, wherein SPS comprises partially co-diffusing the interconnect body powder and the protective powder.

11. The method of claim 1, wherein the SPS comprises applying a DC current to at least partially fuse the interconnect material.

12. The method of claim 11, wherein the SPS further comprises Joule heating the at least partially fused interconnect material to a temperature ranging from about 1000° C. to about 1500° C.

13. The method of claim 12, wherein the SPS further comprises compressing the Joule-heated interconnect material at a pressure of at least 25 MPa.

14. The method of claim 1, wherein the interconnect material does not contain a lubricant.

15. The method of claim 1, further comprising placing the interconnects into a fuel cell stack.

16. The method of claim 15, wherein the interconnects are not oxidized at a temperature above room temperature before being placed into the fuel cell stack.

17. The method of claim 15, wherein the fuel cell stack comprises a solid oxide fuel cell stack.

18. The method of claim 1, further comprising placing the interconnects into an electrolyzer stack.

19. The method of claim 18, wherein the electrolyzer stack comprises a solid oxide electrolyzer stack, and the interconnects are not oxidized at a temperature above room temperature before being placed into the electrolyzer stack.

20. A method of forming an interconnect for an electrochemical cell stack, comprising:

loading a die with an interconnect material comprising a composite interconnect body powder comprising chromium and iron, and a protective powder disposed above or below the interconnect body powder, wherein the protective powder comprises a metal oxide spinel material, a perovskite material, or a combination thereof;

spark plasma sintering (SPS) the composite interconnect material to form an interconnect comprising a body of the interconnect and a protective layer disposed on an air side of the body of the interconnect, wherein the protective layer comprises the metal oxide spinel material, the perovskite material, or the combination thereof;

removing the interconnect from the die;

placing the interconnect on a first electrochemical cell located in the electrochemical cell stack, the first electrochemical cell comprising a first electrolyte, a first anode electrode located on a first side of the first electrolyte, and a first cathode electrode located on a second side of the first electrolyte; and after placing the interconnect, placing a second electrochemical cell on the interconnect in the electrochemical cell stack, the second electrochemical cell comprising a second electrolyte, a second anode electrode located on a first side of the second electrolyte, and a second cathode electrode located on a second side of the second electrolyte.

* * * * *